(12) United States Patent
Zhang

(10) Patent No.: US 8,982,980 B2
(45) Date of Patent: Mar. 17, 2015

(54) FULL AND PARTIAL COMPRESSED FEEDBACK FORMATS FOR WLAN

(71) Applicant: Marvell World Trade Ltd., St. Michael (BB)

(72) Inventor: Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 8 days.

(21) Appl. No.: 13/890,852

(22) Filed: May 9, 2013

(65) Prior Publication Data

US 2013/0308713 A1 Nov. 21, 2013

Related U.S. Application Data

(60) Provisional application No. 61/647,114, filed on May 15, 2012, provisional application No. 61/678,523, filed on Aug. 1, 2012.

(51) Int. Cl.
*H04B 7/06* (2006.01)

(52) U.S. Cl.
CPC ............ *H04B 7/0697* (2013.01); *H04B 7/0634* (2013.01); *H04B 7/0663* (2013.01)
USPC .......................................... 375/267; 375/219

(58) Field of Classification Search
CPC ... H04B 7/0697; H04B 7/0663; H04B 7/0634
USPC .................................................. 375/267, 219
See application file for complete search history.

(56) References Cited

U.S. PATENT DOCUMENTS

| 6,993,299 B2 | 1/2006 | Sugar et al. |
| 7,139,324 B1 | 11/2006 | Ylitalo et al. |
| 7,822,128 B2 | 10/2010 | Maltsev et al. |

(Continued)

FOREIGN PATENT DOCUMENTS

| WO | WO-03 005652 A1 | 1/2003 |
| WO | WO-2009/114612 A1 | 9/2009 |

OTHER PUBLICATIONS

Roh et al., "An Efficient Feedback Method for MIMO Systems With Slowly Time-Varying Channels," WCNC. 2004 IEEE, vol. 2, No. pp. 760-764, 21-25 Mar. 2004.*

(Continued)

*Primary Examiner* — Daniel Washburn
*Assistant Examiner* — Berhanu Tadese

(57) ABSTRACT

In a method of providing channel state information determined at a first communication device to a second communication device, a channel estimate matrix H describing a forward communication channel between the first communication device and the second communication device is determined at the first communication device. Feedback descriptive of the forward communication channel is determined based on the channel estimate matrix H at the first communication device. When operating in a multi user mode or in a single user mode and with multiple spatial streams, full compressed feedback is generated. Full compressed feedback includes $\phi$ angle values and $\psi$ angle values corresponding to each of one or more columns of the channel estimate matrix. When operating in the single user mode and with a single spatial stream, partial compressed feedback is generated. Partial compressed feedback includes $\phi$ angle values, and omits $\psi$ angle values, corresponding to the channel estimate matrix.

22 Claims, 12 Drawing Sheets

(56) References Cited

U.S. PATENT DOCUMENTS

| | | | |
|---|---|---|---|
| 7,873,016 B2* | 1/2011 | Kim | 370/338 |
| 8,165,543 B2 | 4/2012 | Rohit et al. | |
| 8,380,148 B2 | 2/2013 | Nabar et al. | |
| 2003/0181173 A1 | 9/2003 | Sugar et al. | |
| 2006/0040624 A1 | 2/2006 | Lipka | |
| 2006/0116087 A1 | 6/2006 | Sugar et al. | |
| 2006/0239374 A1* | 10/2006 | Aldana et al. | 375/267 |
| 2007/0104288 A1* | 5/2007 | Kim | 375/267 |
| 2008/0299962 A1 | 12/2008 | Kasher | |
| 2012/0033592 A1* | 2/2012 | Kim et al. | 370/310 |
| 2012/0058735 A1* | 3/2012 | Vermani et al. | 455/69 |
| 2012/0062421 A1* | 3/2012 | Su et al. | 342/373 |
| 2012/0195391 A1 | 8/2012 | Zhang et al. | |
| 2012/0275376 A1* | 11/2012 | Sampath et al. | 370/328 |
| 2012/0281620 A1* | 11/2012 | Sampath et al. | 370/328 |
| 2012/0300864 A1* | 11/2012 | Merlin et al. | 375/260 |
| 2013/0010889 A1* | 1/2013 | Ponnampalam | 375/267 |

OTHER PUBLICATIONS

The 802.11 Working Group of the 802 Committee, "IEEE P802.11N-D11.0", Draft Standard, IEEE Jun. 2009.*

Yuen et al.,"Beamforming Matrix Quantization With Variable Feedback," EURASIP Journal on Wireless Communications and Networking 2012.*

IEEE C802.16E-04/516, Nortel Network, "Unified MIMO Pre-Coding Based on Givens Rotation", IEEE Nov. 2004.*

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," The Institute of Electrical and Electronics Engineers, Inc., (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc., Nov. 7, 2001.

IEEE Std 802.11g/D8.2, Apr. 2003 (Supplement to ANSI/IEEE Std 802.11, 1999 (Reaff 2003) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band,"The Institute of Electrical and Electronics Engineers, Inc., Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

"IEEE P802.11nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., Sep. 2007.

"IEEE Std. 802.11nTM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

Nee, et al. "The 802.11n MIMO-OFDM Standard for Wireless LAN and Beyond," Wireless Personal Communications, 37: 445-453 (2006).

Haene, et al. "A Real-Time 4-Stream MIMO-OFDM Transceiver: System Design, FPGA Implementation, and Characterization," IEEE Journal on Selected Areas in Communications, vol. 26, No. 6 (Aug. 2008).

de Vegt, "Potential Compromise for 802.11ah Use Case Document", Institute of Electrical and Electronics Engineers, doc. No. IEEE 802.11-11/0457r0, (Mar. 2011).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.

Yu, et al. "Coverage extension for IEEE802.11ah," The Institute of Electrical and Electronics Engineers, doc. No. IEEE 802.11-11/0035r1, (Jan. 2011).

Vermani, et al. "Preamble Format for 1 MHz," The Institute of Electrical and Electronics Engineers, doc. No. IEEE 802.11-11/1482r2, (Nov. 2011).

Zhang et al., "11ah Data Transmission Flow," The Institute of Electrical and Electronics Engineers, doc. No. IEEE 802.11-11/1484r1, (Nov. 2011).

Taghavi et al., "Introductory Submission for TGah", doc. No. IEEE 802.11-11/0062r0, Institute for Electrical and Electronics Engineers, pp. 1-5 (Jan. 14, 2011).

Leung et al., "Mobility Management Using Proxy Mobile IPv4", Internet Engineering Task Force, Jan. 10, 2007.

S. A. Mujtaba, "IEEE P802.11—Wireless LANS, TGn Sync Proposal Technical Specification," doc.: IEEE 802.11-04/0889r6, May 2005.

IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ, IEEE Std. 802.16a 2003, Apr. 1, 2003.

IEEE Standard for Local and metropolitan area networks: Part 16: Air Interface for Fixed and Mobile Broadband Wireless Access Systems/Amendment 2: Physical and Medium Access Control Layers for Combined Fixed and Mobile operation in Licensed Bands and Corrigendum 1, IEEE Std. 802.16e and IEEE Std. 802.16 2004/Cor 1-2005, Feb. 28, 2006.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: High-speed Physical Layer in the 5 GHZ Band," IEEE Std. 802.11a, 1999.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," IEEE Std. 802.11b, 1999.

"Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher-Speed Physical Layer Extension in the 2.4 GHz Band," IEEE Std. 802.11g/D2.8, May 2002.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Mar. 2012.

Park, "Proposed Specification Framework for TGah", The Institute of Electrical and Electronics Engineers, doc. No. IEEE 802.11-11/1137r6, (Mar. 2012).

(56) References Cited

OTHER PUBLICATIONS

Zhang et al., "11ac Explicit Sounding and Feedback", *The Institute of Electrical and Electronics Engineers*, doc. No. IEEE 802.11-10/1105r0, (Sep. 2010).

Love et al., "An Overview of Limited Feedback in Wireless Communication Systems," IEEE J. on Selected Areas in Communications, vol. 26, No. 8, Oct. 2008.

Invitation to Pay Fees with Partial International Search Report in corresponding Int'l Application No. PCT/US2013/040365, dated Aug. 5, 2013.

Ansari, et al., "Unified MIMO Pre-Coding Based on Givens Rotation," *The Institute of Electrical and Electronics Engineers*, doc. No. IEEE C802.16e-04/516r2, pp. 1-13, Jan. 11, 2005.

Park, "Specification Framework for TGah," *The Institute of Electrical and Electronics Engineers*, doc. No. IEEE 802.11-11/1137r13, pp. 1-58, Jan. 16, 2013.

Zhang et al., "Beamforming Feedback for Single Stream," *The Institute of Electrical and Electronics Engineers*, doc. No. IEEE 802.11-12/1312r0, pp. 1-22, Nov. 12, 2012.

International Search Report in corresponding Int'l Application No. PCT/US2013/040365, mailed Oct. 22, 2013.

Written Opinion in corresponding Int'l Application No. PCT/US2013/040365, mailed Oct. 22, 2013.

\* cited by examiner

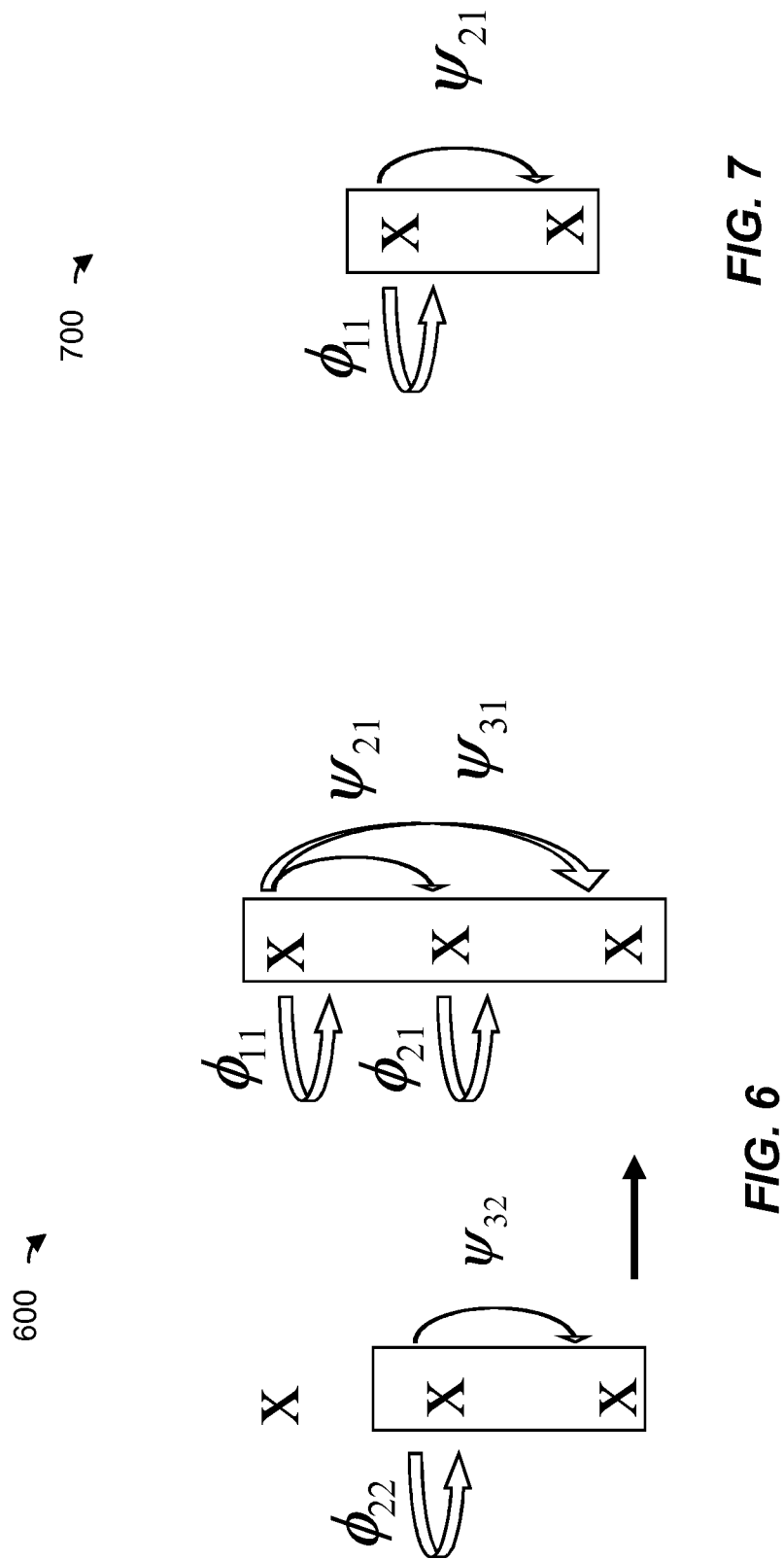

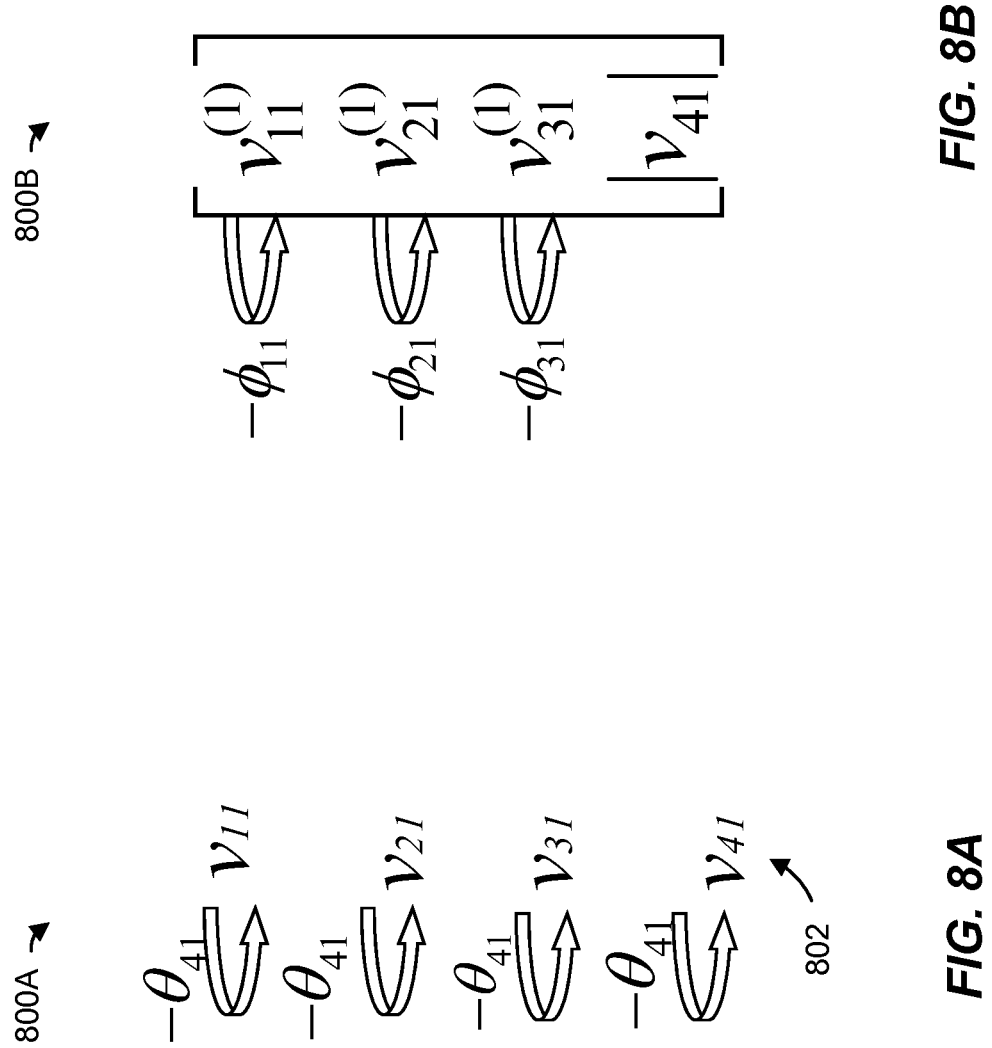

| Size of V (Nr × Nc) | Number of angles (Na) | The order of angles in the Quantized Beamforming Matrices Feedback Information field |
|---|---|---|
| 2×1 | 2 | φ11, ψ21 |
| 2×2 | 2 | φ11, ψ21 |
| 3×1 | 4 | φ11, φ21, ψ21, ψ31 |
| 2×2 | 6 | φ11, φ21, ψ21, φ31, φ22, ψ32 |
| 3×3 | 6 | φ11, φ21, ψ21, φ22, ψ32 |
| 4×1 | 6 | φ11, φ21, φ31, ψ21, ψ31, ψ41 |
| 4×2 | 10 | φ11, φ21, φ31, ψ21, ψ31, ψ41, φ22, φ32, ψ32, ψ42 |
| 4×3 | 12 | φ11, φ21, φ31, ψ21, ψ31, ψ41, φ22, φ32, ψ32, ψ42, φ33, ψ43 |
| 4×4 | 12 | φ11, φ21, φ31, ψ21, ψ31, ψ41, φ22, φ32, ψ32, ψ42, φ33, ψ43 |

| Size of V ($N_r \times N_c$) | Number of angles ($N_a$) | The order of angles in the Quantized Beamforming Matrices Feedback Information field |
|---|---|---|
| 2×1 | 2 | $\phi_{11}, \psi_{21}$ |
| 2×2 | 2 | $\phi_{11}, \psi_{21}$ |
| 3×1 | 4 | $\phi_{11}, \phi_{21}, \psi_{21}, \psi_{31}$ |
| 3×2 | 6 | $\phi_{11}, \phi_{21}, \psi_{21}, \psi_{31}, \phi_{22}, \psi_{32}$ |
| 3×3 | 6 | $\phi_{11}, \phi_{21}, \psi_{21}, \psi_{31}, \phi_{22}, \psi_{32}$ |
| 4×1 | 6 | $\phi_{11}, \phi_{21}, \phi_{31}, \psi_{21}, \psi_{31}, \psi_{41}$ |
| 4×2 | 10 | $\phi_{11}, \phi_{21}, \phi_{31}, \psi_{21}, \psi_{31}, \psi_{41}, \phi_{22}, \phi_{32}, \psi_{32}, \psi_{42}$ |
| 4×3 | 12 | $\phi_{11}, \phi_{21}, \phi_{31}, \psi_{21}, \psi_{31}, \psi_{41}, \phi_{22}, \phi_{32}, \psi_{32}, \psi_{42}, \phi_{33}, \psi_{43}$ |
| 4×4 | 12 | $\phi_{11}, \phi_{21}, \phi_{31}, \psi_{21}, \psi_{31}, \psi_{41}, \phi_{22}, \phi_{32}, \psi_{32}, \psi_{42}, \phi_{33}, \psi_{43}$ |

FULL AND PARTIAL COMPRESSED FEEDBACK FORMATS FOR WLAN

CROSS-REFERENCES TO RELATED APPLICATIONS

This disclosure claims the benefit of U.S. Provisional Patent Application Nos. 61/647,114, entitled "Simple Compressed Beamforming Feedback Single Stream," filed on May 15, 2012, and 61/678,523, entitled "Simple Compressed Beamforming Feedback Single Stream," filed on Aug. 1, 2012, the disclosures of which are hereby incorporated by reference herein in their entirety.

FIELD OF THE DISCLOSURE

The present disclosure relates generally to communication networks and, more particularly, to frame format for compressed feedback for beamforming applications.

BACKGROUND

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

Work has begun on a two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In an embodiment, a method of providing, from a first communication device to a second communication device, channel state information determined at the first communication device, includes determining, with the first communication device, a channel estimate matrix H describing a forward communication channel between the first communication device and the second communication device. The method also includes generating, with the first communication device and based on the channel estimate matrix H, feedback descriptive of the forward communication channel. When operating in a multi user mode or in a single user mode and with multiple spatial streams, generating the feedback comprises generating full compressed feedback, wherein full compressed feedback includes $\phi$ angle values and $\psi$ angle values corresponding to each of one or more columns of the channel estimate matrix. When operating in the single user mode and with a single spatial stream, generating the feedback comprises generating partial compressed feedback, wherein partial compressed feedback includes $\phi$ angle values, and omits $\psi$ angle values, corresponding to the channel estimate matrix. The method further comprises transmitting the feedback from the first communication device to the second communication device.

In another embodiment, an apparatus comprises a network interface configured to determine a channel estimate matrix H describing a forward communication channel between a first communication device and a second communication device. The network interface is also configured to generate feedback descriptive of the forward communication channel. When operating in a multi user mode or in a single user mode and with multiple spatial streams, the network interface is configured to generate full compressed feedback, wherein full compressed feedback includes $\phi$ angle values and $\psi$ angle values corresponding to each of one or more columns of the channel estimate matrix. When operating in the single user mode and with a single spatial stream, the network interface is configured to generate partial compressed feedback, wherein partial compressed feedback includes $\phi$ angle values, and omits $\psi$ angle values, corresponding to the channel estimate matrix. The network interface is further configured to transmit the feedback to the second communication device.

In yet another embodiment, a method of beamforming in a communication system that includes a first communication device and a second communication device includes receiving, at the first communication device from the second communication device, feedback describing a forward communication channel between the first communication device and the second communication device. Feedback corresponds to one of (i) full compressed feedback when the forward communication channel includes multiple spatial streams or when the forward communication channel includes a single spatial stream and the first communication device operates in a multi-user mode, wherein full compressed feedback includes $\phi$ angle values and $\psi$ angle values corresponding to each of one or more columns of a channel estimate matrix determined for the forward communication channel at the second communication device, or (ii) partial compressed feedback when the forward communication channel includes a single spatial stream and the first communication device operates in a single user mode, wherein partial compressed feedback includes $\phi$ angle values and omits $\psi$ angle values corresponding to the channel estimate matrix determined for the forward communication channel at the second communication device. The method also includes determining, based on the feedback, a steering matrix to be applied to signals to be transmitted from the first communication device to the second communication device. The method additionally includes applying the steering matrix to a signal to be transmitted to the second communication device as the signal is provided to multiple transmit antennas at the first communication device.

In still another embodiment, an apparatus comprises a network interface configured to receive, from a first communication device, feedback describing a forward communication channel between the first communication device and a second communication device. Feedback corresponds to one of (i) full compressed feedback when the forward communication channel includes multiple spatial streams or when the forward communication channel includes a single spatial stream and the first communication device operates in a multi-user mode, wherein full compressed feedback includes $\phi$ angle values and $\psi$ angle values corresponding to each of one or more columns of a channel estimate matrix determined for the forward communication channel at the second communication device, or (ii) partial compressed feedback when the forward communication channel includes a single spatial stream and the first communication device operates in a single user mode, wherein partial compressed feedback includes φ angle values and omits ψ angle values corresponding to the channel estimate matrix determined for the forward communication channel at the second communication device. The network interface is also configured to determine, based on the feedback, a steering matrix to be applied to signals to be transmitted to the second device. The network interface is additionally configured to apply the steering matrix to a signal to be transmitted to the second device as the signal is provided to multiple transmit antennas at the first communication device.

BRIEF DESCRIPTION OF THE DRAWINGS

FIG. 6 illustrates an example technique for reconstructing a steering matrix for a 3×3 channel configuration, according to an embodiment.

FIG. 7 illustrates an example technique for reconstructing a steering matrix for a 2×2 channel configuration, according to an embodiment.

FIGS. 8A-8B illustrate an example technique for generating partial compressed feedback for a 4×1 channel configuration, according to an embodiment.

FIG. 10 is a table listing an ordering of compressed feedback angles for different channel configurations when full compressed feedback or partial compressed feedback is utilized, according to some embodiments.

DETAILED DESCRIPTION

In embodiments described below, a wireless network device, such as an access point (AP) of a wireless local area network (WLAN), transmits data streams to one or more client stations. In some embodiments, the WLAN supports multiple input multiple output (MIMO) communication in which the AP and/or the client stations include more than one antenna, thereby creating a plurality of spatial (or space-time) streams over which data can be transmitted simultaneously. In an embodiment in which a transmitting device (e.g., the AP or a client station) employs multiple antennas for transmission, the transmitting device utilizes various antennas to transmit the same signal while phasing (and amplifying) this signal as the signal is provided to the various transmit antennas to achieve beamforming or beamsteering. In order to implement a beamforming technique, the transmitting device generally requires knowledge of certain characteristics of the communication channel (also referred to as "channel characteristics" herein) between the transmitting device and the one or more receiving devices for which a beamforming pattern is to be created. To obtain channel characteristics, according to one embodiment, the transmitting device transmits, to one or more receiving devices, a sounding packet including a number of training fields that allow the receiving devices to accurately estimate the MIMO channel. The one or more receiving devices then transmit or feed-back, in some form, the obtained channel characteristics to the transmitting device, for example by including information characterizing the channel in a management or a control frame transmitted to the transmitting device. Upon receiving, from one or more of the receiving devices, information characterizing the corresponding communication channels, the transmitting device is able to generate desired beam patterns to be used in subsequent transmissions to one or more stations.

Channel state information is generally transmitted by a beamformee in one of several forms, in various embodiments and/or scenarios. For example, the beamformee feeds back channel state information directly, for example by feeding back coefficients of a channel estimate matrix determined at the beamformee. In another embodiment and/or scenario, the beamformee computes a steering matrix, and feeds back coefficients of the steering matrix to the beamformer. Further, in some embodiments or situations, to reduce the amount of feedback that a receiving device needs to transmit to the transmitting device, and to thereby reduce overhead associated with beamforming in the communication network, the beamformee utilizes compressed feedback, in which the steering matrix is transmitted in the form of angles representing, fully or partially, compressed versions of the feedback steering matrix.

Figure 1:
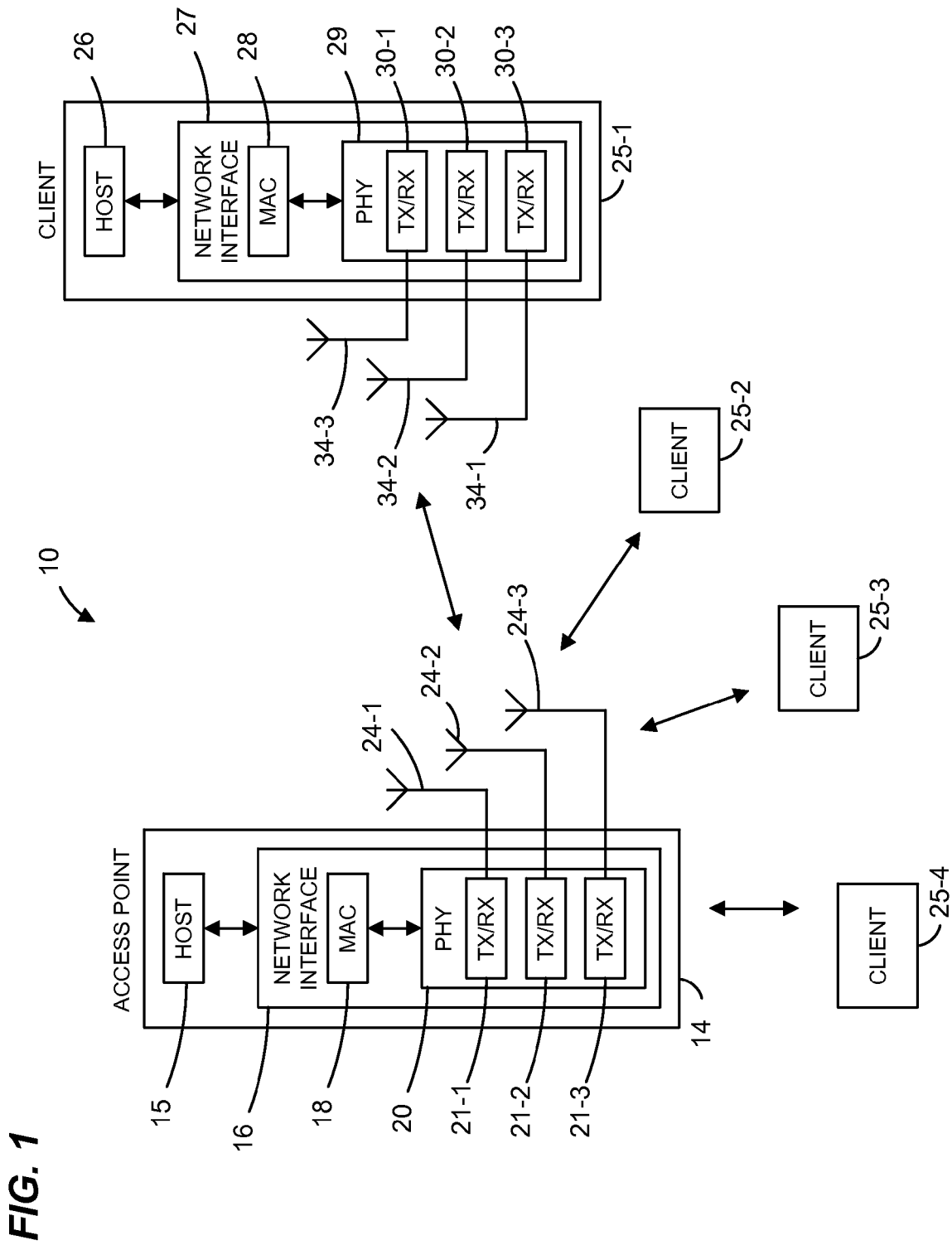
FIG. 1 is a block diagram of an example wireless local area network (WLAN) 10 in which channel state information feedback is utilized, according to an embodiment.

FIG. 1 is a block diagram of an example wireless local area network (WLAN) 10 in which channel state information feedback is utilized, according to an embodiment. The WLAN 10 supports downlink (DL) multiuser (MU) multiple-input and multiple-output (MIMO) communication between an AP 14 and a plurality of client stations 25-i. Additionally, the WLAN 10 supports DL single-user (SU) communication between the AP 14 and each of the client stations 25-i. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In an embodiment, if the AP 14 performs beamforming or beamsteering, and/or if the AP 14 operates in multiuser mode, the AP 14 includes at least two antennas 24. The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments. In an embodiment, if the client station 25-1 performs beamforming or beamsteering, the client station 25-1 includes at least two antennas 34.

In an embodiment, one or all of the client stations 25-2, 25-3 and 25-4 has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to a first communication protocol. The transceiver(s) 21 is/are configured to transmit the generated data units via the antenna(s) 24. Similarly, the transceiver(s) 24 is/are configured to receive data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

In some embodiments, the AP 14 and/or a client station 25 (e.g., the client station 25-1) is capable of performing beamforming, or steering transmissions in the direction of a receiving device. In general, steered transmissions from a first communication device (e.g., Station A) to a second communication device (e.g., Station B) increase signal directivity, thereby providing a higher signal to noise ratio (SNR) at Station B, and further exploit spatial diversity gain from Station A to Station B. Thus, system configurations that employ steered transmissions generally outperform open loop (or unsteered) system configurations, especially in situations in which the number of transmit antennas used to transmit a signal from Station A is greater than the number of spatial streams over which the signal is transmitted from Station A to Station B.

As used herein, the terms "beamforming" and "beamformed" generally refer to transmit-side beamforming (i.e., applying a beamforming steering matrix at the transmitting device) rather than receive-side beamforming. Moreover, in an embodiment, a transmitting device (e.g., the AP 14) supports both single-user (SU) operation and multi-user, multiple-input multiple-output (MU-MIMO) operation, similar to the SU and MU-MIMO operation as defined under IEEE 802.11ac. For convenience, MU-MIMO operation is referred to herein simply as MU operation. While MU operation inherently utilizes beamforming, SU data units generally may be either beamformed (SU-BF data units) or non-beamformed (i.e., "open loop," or SU-OL data units).

In one embodiment, in a single user case, the client station 25-1 is the beamformee, or the device to which beamforming is directed, and the AP 14 is the beamformer, or the device performing beamforming or beamsteering. In another embodiment, in MU operation, the AP 14 performs beamforming simultaneously to a plurality of client stations 25. In this embodiment, each client station 25 to which beamforming is directed is a beamformee, and the AP 14 is the beamformer. In yet another embodiment, the AP 14 is the beamformee and the client station 25-1 is the beamformer.

Generally speaking, the channel between the AP 14 (Station A) and a client station such as, for example, the client station 25-1 (Station B) is, in mathematical terms, characterized by:

$$y_B = H_{AB} Q_{steer} x_A + n_B \qquad \text{Equation 1}$$

where $y_B$ and $n_B$ are the received signal vector and additive noise vector at Station B, respectively; $H_{AB}$ is the equivalent channel from Station A to Station B; $x_A$ is the signal vector to be transmitted from Station A; and $Q_{steer}$ is the steering matrix (which may be a vector) at Station A that spreads the signal vector onto actual transmitting chains at Station A. In an embodiment, the channel matrix $H_{AB}$ has matrix dimensions of $N_{tx} \times N_{rx}$, where $N_{tx}$ is the number of transmit antennas at Station A used for communicating with Station B, and $N_{rx}$ is the number of receive antennas at Station B used for communicating with Station A. In an embodiment, the steering matrix $Q_{steer}$ has matrix dimensions of $N_{tx} \times N_{ss}$, where $N_{tx}$ is the number of transmit antennas at Station A used for communicating with Station B, and $N_{ss}$ is the number spatial (or space-time) streams corresponding to the communication channel between the Station A and the Station B.

The steering matrix $Q_{steer}$ is determined based on the current channel state information (CSI) for the channel between Station A and Station B, in an embodiment. The channel state information is obtained using a variety of techniques, in various embodiments and/or scenarios. For example, in explicit beamforming, Station A "sounds" the channel by transmitting a sounding packet, such as a non data packet (NDP) sounding packet, that includes training information that allows Station B to obtain an estimate $H_{AB}$ of the forward communication channel from Station A to Station B. Then, based on the channel estimate $H_{AB}$, Station B determines a steering matrix V at station B and, to generate compressed feedback, determines a set of angles characterizing the matrix V. The Station B then transmits, or feeds back to the Station A, the compressed feedback comprising the determined angles. Upon receiving the feedback from Station B, Station A reconstructs, based on the set of angles, the steering matrix V determined at Station B. Then, based on the reconstructed steering matrix V, Station A generates a steering matrix $Q_{steer}$ (e.g. $Q_{steer} = V$), and utilizes the steering matrix $Q_{steer}$ in subsequent transmissions to Station B. In the case of an orthogonal frequency division multiplexing (OFDM) system, according to an embodiment, channel estimation is conducted at Station B for each subcarrier, a group of adjacent subcarriers, or a subset of "sampled" subcarriers, and a set of angles corresponding to each "sampled" subcarrier frequency is fed back to Station A.

The steering matrix V is a unitary matrix computed, for example, using SVD decomposition of the channel estimate matrix H, in an embodiment. In this case, QR decomposition of the steering matrix V results in a matrix Q and a matrix R, where R is an identity matrix, and rotation angles determined during QR decomposition of the matrix V fully characterize the matrix V. Thus, the rotation angles determined during QR decomposition of the matrix V are sufficient to be utilized as feedback from Station B to station A, in this embodiment. In some embodiments, to reduce the amount of feedback that needs to be transmitted to Station A, partial rotation angle information is fed back to Station A, in at least some situations. For example, for single stream channel configurations (e.g., $N_{rx}=1$), partial angle information is sufficient to produce beamforming gain for transmissions from Station A to Station B, particularly for single user communications between Station A and Station B. Accordingly, in some embodiments, Station B reduces amount of feedback sent to Station A by transmitting only a portion of angles partially characterizing the matrix V, for at least some system configurations, such in single stream single user system configurations. For example, referring to FIG. 1, the client station 25-4 includes or utilizes only a single antenna for communication with the AP 14, in an embodiment. In this embodiment, the client 25-4 utilizes partial compressed feedback when the AP 14 communicates with the client station 25-4 in single user configuration, and utilizes full compressed feedback when the AP 14 communicates with the client station 25-4 as part of multi user communication with multiple client stations 25. In another embodiment, the client station 25-4 is a single antenna device configured to always utilize partial compressed feedback to feed channel information back to the AP 14.

Figure 2A:
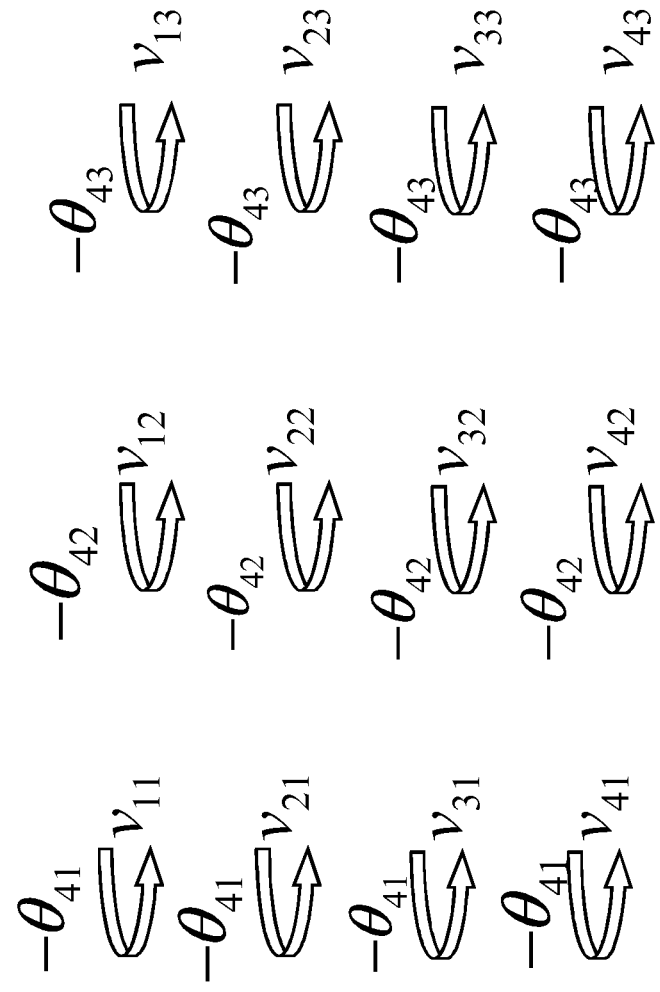
FIGS. 2A-2B illustrate an example technique for generating full compressed feedback information for a 4×3 channel configuration, according to an embodiment.
Figure 2B:
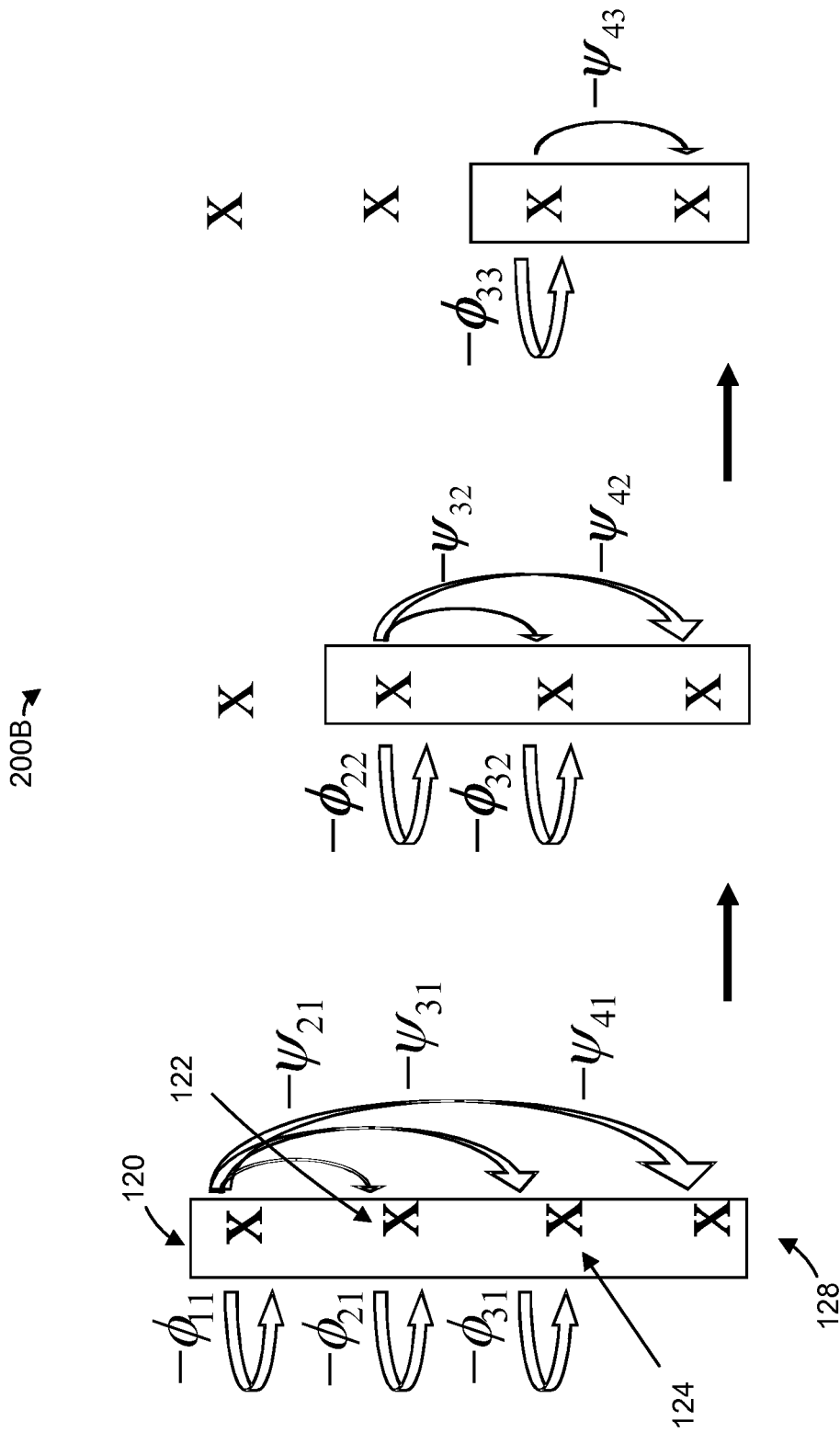

FIGS. 2A-2B illustrate an example technique 200 for generating full compressed feedback information for a 4×3 ($N_{tx}=4$, $N_{rx}=3$) channel configuration, according to an embodiment. In this embodiment, angle rotation and QR decomposition is performed on a steering matrix V having dimension of 4×3. One of ordinary skill in the art will recognize that the algorithm described with reference to FIGS. 2A-2B can be straightforwardly modified for steering matrices V having other suitable dimensions (e.g., 4×2, 4×1, 3×3, 3×2, 3×1, 2×2, 2×1, or other suitable dimensions). In an embodiment, a client station 25 (e.g., the client station 25-1) utilizes the technique 200 to generate full compressed feedback when communicating with the AP 14 in a multi-stream (single user or multi-user) configuration.

Referring to FIG. 2A, a steering matrix V to be decomposed is represented by a 4×3 array of elements v. As illustrated in FIG. 2A, each column of the matrix V is rotated such that each element in the last row of the matrix V becomes a real non-negative value. To this end, in an embodiment, first each element of the first column of the matrix V is rotated by the angle corresponding to the element $V_{41}$ (i.e. $\theta_{41}$), then each element of the second column is rotated by the angle corresponding to the element $V_{42}$ (i.e. $\theta_{42}$), and finally each element of the third column is rotated by the angle corresponding to the element $V_{43}$ (i.e. $\theta_{43}$). In effect, this angle rotation can be represented as a matrix multiplication of the matrix V and a diagonal matrix P, as shown in Equation 2:

$$V' = V \cdot P = V \cdot \begin{bmatrix} e^{-j\theta_{41}} & & \\ & e^{-j\theta_{42}} & \\ & & e^{-j\theta_{43}} \end{bmatrix} \quad \text{Equation 2}$$

Referring now to FIG. 2B, the technique 200 continues with QR decomposition of the resulting matrix V', according to an embodiment. In FIG. 2B, the matrix V' is illustrated as a 4×3 array of elements X. First, a matrix $Q_{\phi 11}$ is determined such that multiplying it by the original matrix V' will cause the complex element 120 to become a real number. In effect, this process results in a rotation of the complex element 122 by an angle $-\phi_{11}$. Then, matrix $Q_{\phi 21}$ is determined such that multiplying $Q_{\phi 21}Q_{\phi 11}$ by the original matrix V' will cause the complex element 122 to become a real number. In effect, this process results in a rotation of the complex element 122 by an angle $-\phi_{21}$. Similarly, $Q_{\phi 31}$ is determined such that multiplying $Q_{\phi 31}Q_{\phi 21}Q_{\phi 11}$ by the original matrix V' will cause the complex element 124 to become a real number. In effect, this process results in a rotation of the complex element 124 by an angle $-\phi_{31}$.

Next, a matrix $Q_{\psi 21}$ is determined such that multiplying $Q_{\psi 21}Q_{\phi 31}Q_{\phi 21}Q_{\phi 11}$ by the original matrix V' results in a rotation of the vector including elements 120 and 122 by an angle $(-\psi_{21})$ that causes the element 122 to go to zero. Then, a matrix $Q_{\psi 31}$ is determined such that $Q_{\psi 31}Q_{\psi 21}Q_{\phi 31}Q_{\phi 21}Q_{\phi 11}$ by the original matrix V' results in a rotation of the vector including elements 120 and 124 by an angle $(-\psi_{31})$ that causes the element 124 to go to zero. Similarly, a matrix $Q_{\psi 41}$ is determined such that $Q_{\psi 41}Q_{\psi 31}Q_{\psi 21}Q_{\phi 31}Q_{\phi 21}Q_{\phi 11}$ by the original matrix V' results in a rotation of the vector including elements 120 and 128 by an angle $(-\psi_{41})$ that causes the element 128 to go to zero. In subsequent iterations, non-zero elements of each of the next two columns are rotated in the same manner, as illustrated in FIG. 2B. According to an embodiment, angle rotation and QR decomposition of the steering matrix V can be represented by:

$$\begin{bmatrix} 1 & & & \\ & 1 & & \\ & & \cos(\psi_{43}) & \sin(\psi_{43}) \\ & & -\sin(\psi_{43}) & \cos(\psi_{43}) \end{bmatrix} \times \ldots \times \quad \text{Equation 3}$$

$$\begin{bmatrix} \cos(\psi_{31}) & & \sin(\psi_{31}) & \\ & 1 & & \\ -\sin(\psi_{31}) & & \cos(\psi_{31}) & \\ & & & 1 \end{bmatrix} \times$$

$$\begin{bmatrix} \cos(\psi_{21}) & \sin(\psi_{21}) & & \\ -\sin(\psi_{21}) & \cos(\psi_{21}) & & \\ & & 1 & \\ & & & 1 \end{bmatrix} \times$$

$$\begin{bmatrix} e^{-j\theta_{11}} & & & \\ & e^{-j\theta_{21}} & & \\ & & e^{-j\theta_{31}} & \\ & & & 1 \end{bmatrix} \times V' = \begin{bmatrix} r_{11} & & \\ & r_{22} & \\ & & r_{33} \end{bmatrix}$$

Thus, the process of angle rotation of the steering matrix V and QR decomposition of the resulting matrix V' results in a matrix diagonal matrix R and a product of the rotation matrices Q determined during QR decomposition of the matrix V. Further, rotation angles $\psi_{i,j}$ and $\phi_{k,l}$ determined during decomposition of the matrix V' are sufficient to reconstruct the original steering matrix V, where the indices i, j, k and l are integers greater than or equal to 1. Accordingly, the beamformee transmits the rotation angels $\psi_{i,j}$ and $\phi_{k,l}$ to the beamformer to allow the beamformer to conduct beamforming in the direction of the beamformee, in an embodiment. For simplicity, in the descriptions below the indices i, j, k and 1 are sometime dropped, and the rotation angles $\psi_{i,j}$ and $\phi_{k,l}$ are sometimes referred to herein as simply ψ angles (or ψ angle values) and φ angles (or φ angle values), respectively.

Figure 3:
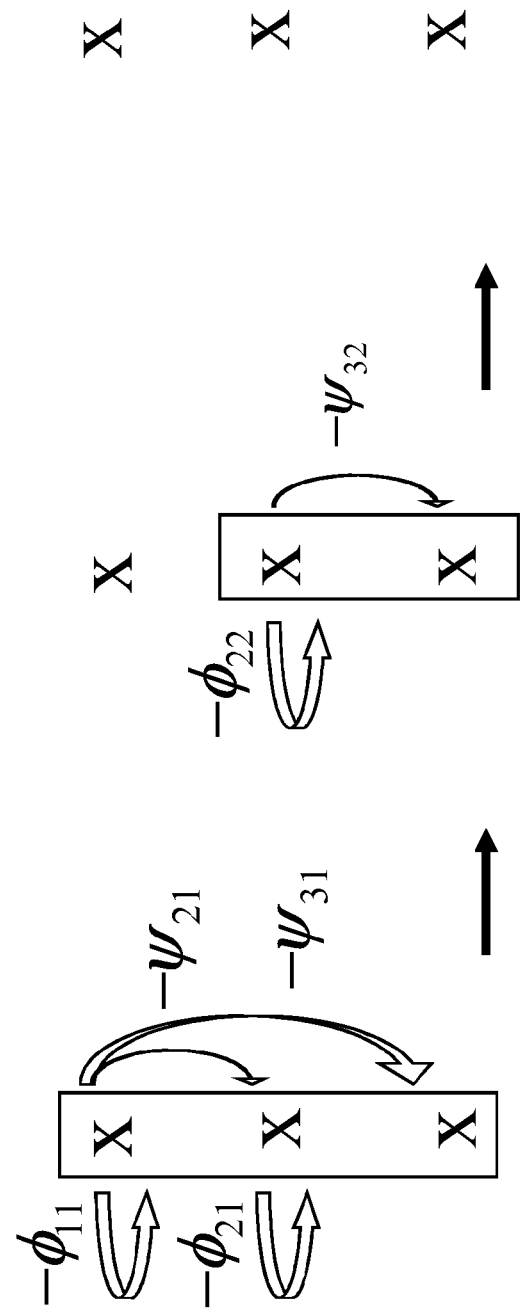
FIG. 3 illustrates an example technique for QR decomposition of a steering matrix for a 3×3 channel configuration, according to an embodiment.
Figure 4:
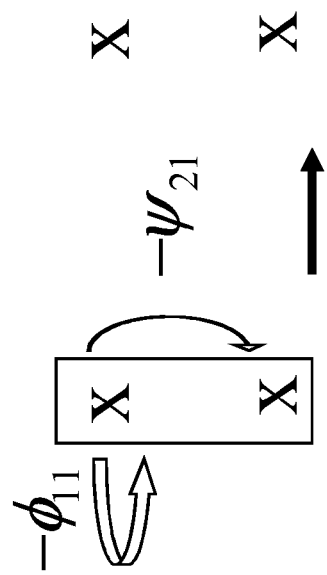
FIG. 4 illustrates an example technique for QR decomposition of a steering matrix for a 2×2 channel configuration, according to an embodiment.

FIG. 3 illustrates an example technique 300 for QR decomposition of a steering matrix V' for a 3×3 ($N_{TX}=3$, $N_{RX}=3$) channel configuration, according to an embodiment. The QR decomposition technique 300 is similar the QR decomposition technique 200B of FIG. 2, except that the decomposition technique 300 is performed for a steering matrix V' having dimensions of 3×3. Similarly, FIG. 4 illustrates an example technique 400 for QR decomposition of a steering matrix V' for a 2×2 ($N_{TX}=2$, $N_{RX}=2$) channel configuration, according to an embodiment. The QR decomposition technique 400 is similar the QR decomposition technique 200B of FIG. 2, except that the decomposition technique 300 is performed for a steering matrix V' having dimensions of 2×2.

In an embodiment, upon determining rotation angles $\psi_{i,j}$ and $\phi_{k,l}$ during QR decomposition process of the matrix V', the beamformee quantizes the determined values of the rotation angles $\psi_{i,j}$ and $\phi_{k,l}$, and feeds back the quantized values of the angles $\psi_{i,j}$ and $\phi_{k,l}$ to the beamformer. In an embodiment, the $\phi_{k,l}$ angles are in the range of $\phi \in [0, 2\pi)$, and each $\phi_{k,l}$ angle is quantized to an integer number $k_\phi$. Similarly, the $\psi_{i,j}$ angles are in the range of $$\psi \in \left[0, \frac{\pi}{2}\right),$$

and each $\psi_{i,j}$ angle is quantized to an integer number $k_\psi$. According to an embodiment, the integers $k_\phi$ and $k_\psi$ are given by:

$$k_\phi = \operatorname{round}\left[\left(\phi - \frac{\pi}{2^{b_\phi}}\right) \cdot \frac{2^{b_\phi}}{2\pi}\right] \quad \text{Equation 4}$$

$$k_\psi = \operatorname{round}\left[\left(\psi - \frac{\pi}{2^{b_\psi}}\right) \cdot \frac{2^{b_\psi}}{2\pi}\right]$$

where $b_\phi$ and $b_\psi$ are quantization levels used to quantize rotation angles $\phi_{k,l}$ and rotation angles $\psi_{i,j}$ respectively. As an example, in one embodiment, $b_\phi=4$ and $b_\psi=2$. In this embodiment, the angles $\phi_{k,l}$ are quantized using four bits, and the angles $\psi_{i,j}$ angles are quantized using two bits. In other embodiments, other suitable quantization levels for the angles $\phi_{k,l}$ and/or the angles $\psi_{i,j}$ are utilized. For example, in one embodiment, the values for $b_\phi$ and $b_\psi$ are selected from sets $\{b_\phi, b_\psi\} = \{3,1\}, \{4,2\}, \{5,3\}, \{6,4\}$. In another embodiment, the values for $b_\phi$ and $b_\psi$ are selected from sets $\{b_\phi, b_\psi\} = \{4,2\}, \{6,4\}$ for single user transmissions, and from sets $\{b_\phi, b_\psi\} = \{7,5\}, \{9,7\}$ for multi-user transmissions.

Figure 5:
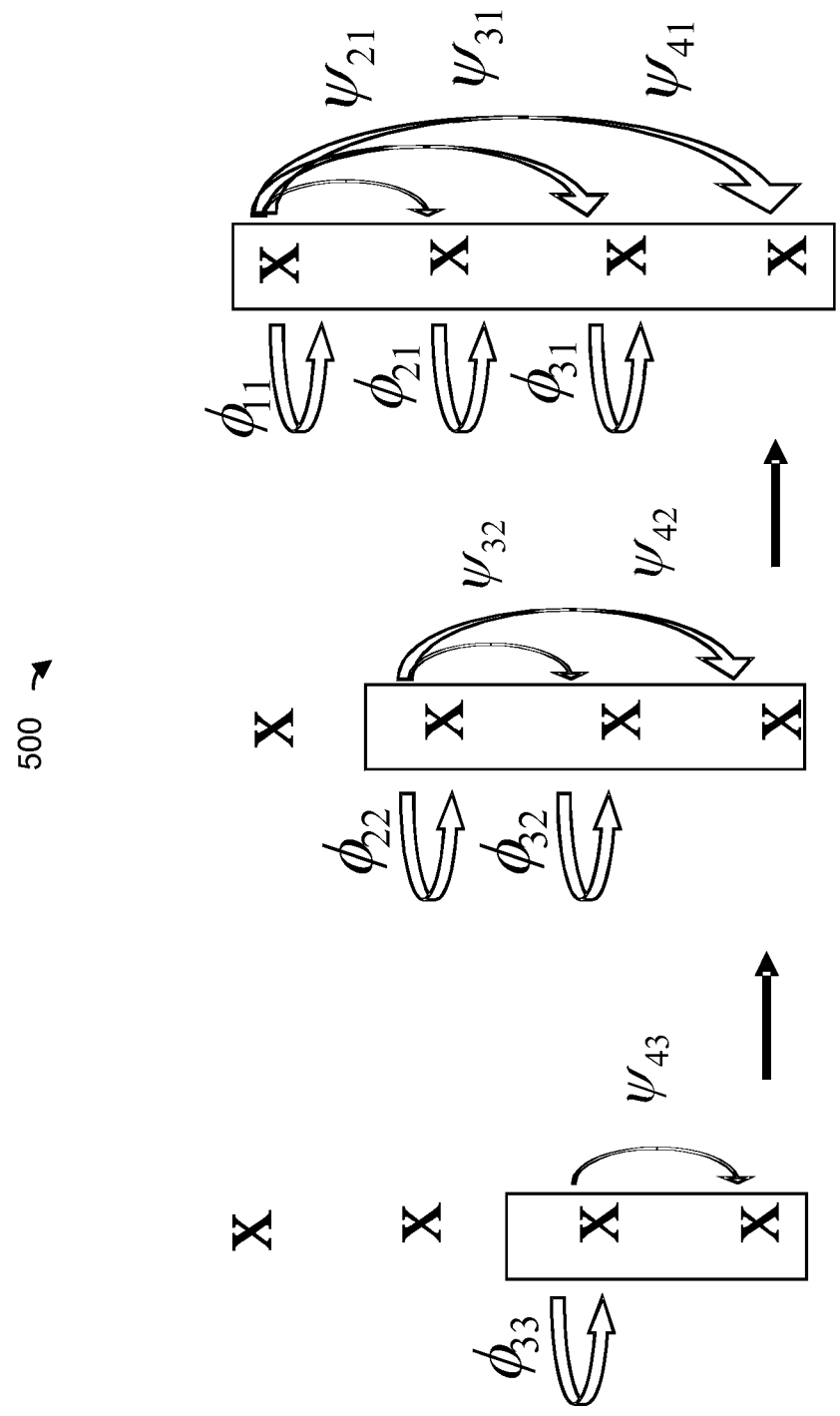
FIG. 5 illustrates a technique for reconstructing a steering matrix for a 4×3 channel configuration, according to an embodiment.

Upon receiving the quantized rotation angles $\psi_{i,j}$ and $\phi_{k,l}$ from the beamformee, the beamformer de-quantizes the rotation angles $\psi_{i,j}$ and $\phi_{k,l}$, and performs angle de-rotation to reconstruct the steering matrix V. FIG. 5 illustrates a technique 500 for reconstructing the steering matrix V for a 4×3 channel configuration, according to an embodiment. In an embodiment, a beamformer (e.g., the AP 14) utilizes the technique 500 to reconstruct a steering matrix V determined for a 4×3 channel configuration at a beamformee (e.g., the client station 25-1) based on rotation angles $\psi_{i,j}$ and $\phi_{k,l}$ received from the beamformee. The technique 500 effectively reverses QR decomposition process described above with respect to FIG. 2B by rotating elements of an identity matrix using the rotation angles $\psi_{i,j}$ and $\phi_{k,l}$ determined according to the technique 200B of FIG. 2B. In this embodiment, the de-rotation process performed according to the technique 500 can be represented by:

$$V = \begin{bmatrix} e^{-j\phi_{11}} & & & \\ & e^{-j\phi_{21}} & & \\ & & e^{-j\phi_{31}} & \\ & & & 1 \end{bmatrix} \times \quad \text{Equation 5}$$

$$\begin{bmatrix} \cos(\psi_{21}) & \sin(\psi_{21}) & & \\ -\sin(\psi_{21}) & \cos(\psi_{21}) & & \\ & & 1 & \\ & & & 1 \end{bmatrix} \times$$

$$\begin{bmatrix} \cos(\psi_{31}) & & \sin(\psi_{31}) & \\ & 1 & & \\ -\sin(\psi_{31}) & & \cos(\psi_{31}) & \\ & & & 1 \end{bmatrix} \times \ldots \times$$

$$\begin{bmatrix} 1 & & & \\ & 1 & & \\ & & e^{-j\varphi_{33}} & \\ & & & 1 \end{bmatrix} \times$$

$$\begin{bmatrix} 1 & & & \\ & 1 & & \\ & & \cos(\psi_{43}) & \sin(\psi_{43}) \\ & & -\sin(\psi_{43}) & \cos(\psi_{43}) \end{bmatrix} \times \begin{bmatrix} 1 & & \\ & 1 & \\ & & 1 \end{bmatrix}$$

FIG. 6 illustrates an example technique 600 for reconstructing the steering matrix V for a 3×3 channel configuration, according to an embodiment. The technique 600 is similar the technique 500 of FIG. 5, except that the decomposition technique 600 is performed for a steering matrix V' having dimensions of 3×3. The technique 600 effectively reverses QR decomposition technique 300 illustrated in FIG. 3 by rotating elements of an identity matrix using rotation angles $\psi_{i,j}$ and $\phi_{k,l}$ determined according to the technique 300 of FIG. 3. Similarly, FIG. 7 illustrates an example technique 700 for reconstructing the steering matrix V for a 2×2 channel configuration, according to an embodiment. The technique 700 is similar the technique 500 of FIG. 5, except that the decomposition technique 700 is performed for a steering matrix V' having dimensions of 2×2. The technique 700 effectively reverses QR decomposition technique 400 illustrated in FIG. 4 by rotating elements of an identity matrix using angles $\psi_{i,j}$ and $\phi_{k,l}$ determined according to the technique 400 of FIG. 4.

As discussed above, in some embodiments, one or more of the client stations 25 are configured to generate partial compressed feedback, and to transmit partial compressed feedback to the AP 14, in at least some situations (e.g., for single stream, single user system configurations). Partial compressed feedback includes a partial description of the channel, sufficient to obtain suitable beamforming gain when conducting beamforming in the direction of a beamformee using a steering matrix ($Q_{steer}$) determined based on the partial compressed feedback received from the beamformee, according to an embodiment. For example, all or most beamforming gain is achieved by utilizing phase information of a computed beamsteering matrix (or vector, in the case of single stream channel), and omitting the magnitude information, in at least some system configurations, such as in single stream system configurations. As an example, consider a steering matrix computed using single value decomposition (SVD) for a 4×1 channel case. In this example, the beamformee determines a channel matrix H (e.g., based on a sounding packet received from the beamformer), and performs SVD decomposition of the channel matrix to generate a steering matrix V. The channel matrix H for a 4×1 channel can be represented as H=[$h_{11}$ $h_{12}$ $h_{13}$ $h_{14}$]. Then, the beamformee determines a steering matrix V based on the channel matrix H based on SVD of the channel matrix H, in an embodiment. In this embodiment, the steering matrix V is given by $$V = \frac{H^H}{\|H\|} = \frac{1}{\|H\|}\begin{bmatrix} h_{11}^* \\ h_{12}^* \\ h_{13}^* \\ h_{14}^* \end{bmatrix} = \frac{1}{\|H\|}\begin{bmatrix} |h_{11}|e^{-jw_{11}} \\ |h_{12}|e^{-jw_{12}} \\ |h_{13}|e^{-jw_{13}} \\ |h_{14}|e^{-jw_{14}} \end{bmatrix} \quad \text{Equation 6}$$

Having determined the steering matrix V, the beamformee performs a partial de-compression of the determined V matrix, as described in more detail below, and feeds the quantized φ angle values back to the beamformer. The beamformer receives the feedback and de-quantizing the φ angle values provided in the feedback. Then, based on the de-quantized φ angle values, the beamformer computes a phase only approximation V' of the steering matrix V $$V' \approx \begin{bmatrix} e^{j\phi_{11}} \\ e^{j\phi_{21}} \\ e^{j\phi_{31}} \\ 1 \end{bmatrix} = \begin{bmatrix} e^{j(w_{11}-w_{41})} \\ e^{j(w_{21}-w_{41})} \\ e^{j(w_{31}-w_{41})} \\ 1 \end{bmatrix} \quad \text{Equation 7}$$

The beamformer then utilizes the approximation V' to perform beamsteering in the direction of the beamformee. In this case, the beamformed channel to the beamformee can be represented by $$HV' = [h_{11}h_{12}h_{13}h_{14}] \times \begin{bmatrix} e^{j(w_{11}-w_{41})} \\ e^{j(w_{21}-w_{41})} \\ e^{j(w_{31}-w_{41})} \\ 1 \end{bmatrix} \quad \text{Equation 8}$$

$$= (|h_{11}| + |h_{12}| + |h_{13}| + |h_{14}|) \cdot e^{jw_{14}}$$

Because a steering matrix determined at a beamformer based on partial compressed feedback received from a beamformee provides sufficient beamforming gain for subsequent transmission to the beamformee, beamforming with sufficient beamforming gain is conducted with a reduced overhead associated with feedback of channel state information to the beamformee, in at least some embodiments. Partial compressed feedback is utilized by devices that conform to long range, low frequency communication protocols, such as IEEE-802.11af and/or IEEE-802.11 ah Standards, for example, in some embodiments. In such embodiments, antenna size needed to operate at low (e.g., sub-1 GHz) frequencies and antenna separation needed to construct an antenna array at the low operating frequencies limit receiving devices (or beamformees) to a single antenna available to communicate with a beamformer. Further, devices that operate according to such long range low frequency communication protocols are often small, power battery devices (e.g., sensors) that are constrained to a single antenna by power available at the device, size of the device and/or cost of the device, in some embodiments. Accordingly, in such embodiments, the beamformer (e.g., the AP 14) communicates with the beamformee, and steers transmissions to the beamformee, using a single spatial stream, such as in $N_{tx} \times 1$ channel configurations well suited for partial compressed feedback, in at least some situations, such as for single user communications. In other embodiments, partial compressed feedback is utilized in other communication protocols and/or for other suitable channel configurations.

FIGS. 8A-8B illustrate an example technique 800 for generating partial compressed feedback information for a 4×1 communication channel configuration, according to an embodiment. In this example embodiment, a beamformee obtains a 4×1 channel estimate matrix H (e.g., based on a sounding packet received from a beamformer), and based on the channel estimate matrix H, determines a 4×1 steering vector V. Referring to FIG. 8A, the steering vector V is represented by a 4×1 vector of elements v. Referring to FIG. 8A, each element of the steering vector V is rotated such that element 802 of the steering vector V becomes a real non-negative value. As illustrated in FIG. 8A, each element of the steering vector V is rotated by the angle corresponding to the element 802 (i.e. $\theta_4$). Accordingly, in this embodiment, the resulting vector V' can be represented as:

$$V' = \begin{bmatrix} v_{11} \\ v_{21} \\ v_{31} \\ v_{41} \end{bmatrix} \cdot e^{-j\theta_{41}} = \begin{bmatrix} v_{11}^{(1)} \\ v_{21}^{(1)} \\ v_{31}^{(1)} \\ |v_{41}^{(1)}| \end{bmatrix} \quad \text{Equation 9}$$

Referring now to FIG. 8B, the technique 800 continues with a partial QR decomposition of the resulting vector V', according to an embodiment. In FIG. 8B, the vector V' is illustrated as a 4×1 vector of elements v'. First, a vector $Q_{\phi 11}$ is determined such that multiplying it by the original vector V' will cause the complex element $V_{11}^{(1)}$ to become a real number. In effect, this process results in a rotation of the complex element $V_{11}^{(1)}$ by an angle $-\phi_{11}$. Then, matrix matrix $Q_{\phi 21}$ is determined such that multiplying $Q_{\phi 21}Q_{\phi 11}$ by the original vector V' will cause the complex element $V_{21}^{(1)}$ to become a real number. In effect, this process results in a rotation of the complex element $V_{21}^{(1)}$ by an angle $-\phi_{21}$. Similarly, Q determined such that multiplying $Q_{\phi 31}Q_{\phi 21}Q_{\phi 11}$ by the original vector V' will cause the complex element $V_{31}^{(1)}$ to become a real number. In effect, this process results in a rotation of the complex element $V_{31}^{(1)}$ by an angle $-\phi_{31}$. This rotation process can be represented by:

$$V^{(2)} = \begin{bmatrix} e^{-j\phi_{11}} & & & \\ & e^{-j\phi_{21}} & & \\ & & e^{-j\phi_{31}} & \\ & & & 1 \end{bmatrix} \times \quad \text{Equation 10}$$

-continued $$V^{(1)} = \begin{bmatrix} v_{11}^{(1)} e^{-j\phi_{11}} \\ v_{21}^{(1)} e^{-j\phi_{21}} \\ v_{31}^{(1)} e^{-j\phi_{31}} \\ |v_{41}| \end{bmatrix} = \begin{bmatrix} v_{11}^{(1)} \\ v_{21}^{(1)} \\ v_{31}^{(1)} \\ |v_{41}| \end{bmatrix}$$

In contrast to full compressed feedback techniques described above, in the partial feedback technique 800, the rotation process is not continued to determine values of ψ angles, in an embodiment. Instead, the determined ψ angle values are quantized and fed back to the beamformer. From Equations 6 and 7, it can be seen that, in this embodiment, ψ angles determined during the angle rotation are represented by:

$$\phi_{11} = \theta_{11} - \theta_{41}$$

$$\phi_{21} = \theta_{21} - \theta_{41}$$

$$\phi_{31} = \theta_{31} - \theta_{41} \quad \text{Equation 11}$$

In some embodiments, φ angles for partial compressed feedback are determined directly based on a channel matrix obtained at a beamformee without performing compression of a steering matrix determined based on the channel matrix determined at the beamformee. For example, from Equation 7 for an example 4×1 channel configuration described above, it can be seen that φ angles can be determined from a channel matrix obtained for the 4×1 channel directly according to:

$$\phi_{11} = w_{14} - w_{11}$$

$$\phi_{21} = w_{14} - w_{12}$$

$$\phi_{31} = w_{14} - w_{13} \quad \text{Equation 12}$$

Accordingly, the beamformee does not perform compression of a steering matrix V' to determine φ angle values to be fed back to the beamformer when partial compressed feedback is being utilized, in an embodiment. Rather, the beamformee determines φ angle values to be fed back to the beamformer directly from a channel matrix H obtained at the beamformee, when partial compressed feedback is being utilized, in this embodiment.

Upon receiving the quantized φ angle values, the beamformer de-quantizes the quantized φ angle values, and constructs a steering vector V based on the de-quantized angles φ. To generate a steering vector V, in one embodiment, the beamformer performs de-rotation (starting with an identity vector) using the de-quantized angles φ and assumed, or pre-determined, values for angles ψ. For example, in an embodiment, equal gain ψ angles having pre-determined values given in Equation 13 below are utilized.

$$\psi_{21} = \frac{\pi}{4}, \psi_{31} = 0.196\pi, \psi_{41} = 0.167\pi \quad \text{Equation 13}$$

In other embodiment, other equal gain values for $\{\psi_{EG}\} = \{\psi_{21}, \psi_{31}, \psi_{41}\}$ are utilized. In general, any suitable values for the ψ angles can be assumed at the beamformer, and other suitable predetermined values for the ψ angles are utilized in other embodiments.

For example, approximations of the ψ angles given in Equation 13, such as quantized values of these ψ angle values are utilized, in some embodiments. As an example, ψ angle values given in Equation 13 are quantized to two bits ($b_\psi = 2$), in an embodiment. In this embodiment, $\{\psi_{EG}\}$ is given by $$\{\psi_{EG}\} = \left\{\frac{\pi}{4}, \frac{\pi}{8}, \frac{\pi}{8}\right\}.$$

In another embodiment, approximations of the values given in Equation 13 using a suitable quantization other than 3 bits are utilized. To provide a few other examples, for a 3×1 communication channel configuration, $$\{\psi_{EG}\} = \left\{\frac{\pi}{4}, 0.196\pi\right\}.$$

or suitable approximations of these values, are utilized for $\psi_{EG}$ angle values, in an embodiment. As another example, for 2×1 channel configuration $$\{\psi_{EG}\} = \left\{\frac{\pi}{4}\right\},$$

or a suitable approximation of this values, is utilized for $\psi_{EG}$ angle values, in an embodiment.

In embodiments and/or scenarios with other single stream channel configurations, a corresponding different set of ψ angle values is utilized. For example, in a 3×1 channel configuration, $$\{\psi_{EG}\} = \left\{\frac{\pi}{4}, 0.196\pi\right\},$$

or a suitable approximation of these ψ angel values is utilized. As another example, in a 2×1 channel configuration $$\{\psi_{EG}\} = \left\{\frac{\pi}{4}\right\},$$

or a suitable approximation of this value is utilized. In other embodiments, other suitable $\psi_{EG}$ angle values in single stream channel configurations are utilized.

In some embodiments, after steering matrix is applied to signals at the beamformer, the signals are provided to a plurality of power amplifiers (PAs), each PA corresponding to a different one of the transmit antennas at the beamformer. Each PA is driven at a maximum power level to maximize transmit power output by the corresponding transmit antenna, in at least some embodiments and/or situations. In some such embodiments, power balancing between the different PAs is performed, for example by determining a maximum signal gain applied to the signals provided to the PAs, and comparing each other signal gain to the maximum signal gain. Then output powers of the PAs are adjusted based on the signal gain comparisons, in an embodiment. As discussed above, in embodiments and/or scenarios in which partial compressed feedback is utilized, a beamformee feeds back φ angle values to a beamformer, and omits feeding back ψ angle values to the beamformer (partial compressed feedback), the magnitude information of the V matrix is effectively lost, and only the phase information is fed back to the beamformer. A steering matrix to be applied a signal transmitted to the beamformee is then determined such that appropriate phases are applied to the signals provided to different antennas, and equal gain is applied to the signals provided to different antennas, in some such embodiments. In such embodiments, beamforming gain is substantially similar to beamforming gain achieved in systems in which full compressed feedback is utilized because magnitudes of signals transmitted from different antennas are balanced to achieve maximum output power even when magnitude information is utilized for determining the steering matrix at the beamformer. Further, in embodiments in which equal gain is assumed for determining the steering matrix at a beamformee, PA control is simplified because equal beam-steering gain is applied to the signal as the signal is provided to each of the PAs, and therefore, output power balancing of the PAs need not be performed. In some embodiments, PA power balancing is enabled at the beamformer for system configurations in which full compressed feedback is utilized, and disabled for system configurations in which partial compressed feedback is utilized.

In an embodiment, upon receiving quantized φ angle values from the beamformee, the beamformer reconstructs the steering matrix V without performing decomposition with the received φ angle values. That is, having received and de-quantized the φ angle values, the beamformer constructs an approximate, phase-only version V' of the steering matrix that was computed at the beamformee. The reconstructed steering matrix V' can be represented as:

$$V' \approx \begin{bmatrix} e^{j\phi_{11}} \\ e^{j\phi_{21}} \\ e^{j\phi_{31}} \\ 1 \end{bmatrix} = \begin{bmatrix} e^{j(\theta_{11}-\theta_{41})} \\ e^{j(\theta_{21}-\theta_{41})} \\ e^{j(\theta_{31}-\theta_{41})} \\ 1 \end{bmatrix} = e^{-j\theta_{41}} \begin{bmatrix} e^{j\theta_{11}} \\ e^{j\theta_{21}} \\ e^{j\theta_{31}} \\ e^{j\theta_{41}} \end{bmatrix} \quad \text{Equation 14}$$

The beamformer then utilizes the reconstructed version of the steering matrix V' to conduct beamforming in the direction of the beamformee, according to an embodiment.

Figure 9:
FIG. 9 is a table listing an ordering of compressed feedback angles for different channel configurations when full compressed feedback is utilized, according to some embodiments.

FIG. 9 is a table 900 listing an ordering of compressed feedback angles for different channel configurations, according to some embodiments. Ordering listed in the table 900 is utilized for various channel configurations when the AP 14 operates in multi user mode, i.e., when the AP 14 transmits to multiple ones of the client stations 25-i simultaneously. The table 900 corresponds to system configurations in which full compressed feedback is utilized for the listed channel configurations, according to an embodiment. Accordingly, the table 900 includes ordering for both φ and ψ angles for each of the listed channel configurations. FIG. 10 is a table 1000 listing an ordering of compressed feedback angles for different channel configurations, according to some embodiments. Ordering listed in the table 1000 is utilized for various channel configurations when the AP 14 operates in single user mode, i.e., when the AP 14 transmits to only one of the client stations 25-i at a time. The table 1000 corresponds to system configurations in which partial compressed feedback is utilized for some of the listed channel configurations, according to an embodiment. The table 1000 is similar to the table 900 of FIG. 9, except that ψ angles are "struck out" or "punctured" from the table 1000 for channel configurations for which partial compressed feedback is utilized.

In some embodiments, partial compressed feedback is utilized for single user beamforming in additional channel configurations not indicated in FIG. 10. For example, in some embodiments, partial compressed feedback is utilized for a 2×2 channel configuration when single user mode of operation is being utilized. In such embodiments, ψ angles are additionally punctured from the table 1000 for the 2×2 channel configuration listed in the table 1000. In some such embodiments, a steering matrix V' reconstructed at the beamformer includes phase—only version of the first column of the steering matrix V' computed at the beamformee, and a distorted version of the second column of the steering matrix V' computed at the beamformee. In an embodiment, the beamformer utilizes the first column of the steering matrix V' reconstructed at the beamformer to steer a single stream in the direction of the beamformee.

Further, in some embodiments, partial compressed feedback is additionally utilized for some or all multi-stream channel configurations listed in table 1000 of FIG. 10. In some such embodiments, ψ angles corresponding to only the first column of the steering matrix V' are punctured from the ordering listed for these channel configurations the table 1000 of FIG. 10. For example, for the 4×1 channel configuration, angles {ψ_{21},ψ_{31}, ψ_{41}} are struck out from table 1000, in an embodiment. In this embodiments, predetermined equal gain values {ψ_{21},ψ_{31},ψ_{41}} as described above, for example, are utilized at the beamformer to reconstruct the first column of the steering matrix V', and ψ angles fed back from the beamformee are utilized to reconstruct the second and the third columns of the steering matrix V'. In this case, a phase-only version of the first column of the steering matrix V' is obtained at the beamformee, and the second and third columns of the steering matrix V' reconstructed at the beamformer are distorted versions of the corresponding columns of the steering matrix V' computed at the beamformee. Referring to FIG. 1, such partial compressed feedback in which ψ angles corresponding to only the first column of a steering matrix V' computed at a client station 25 are punctured from feedback from the client station 25 is utilized by the AP 14 to steer single stream pilot tones in subsequent multi-stream transmissions to the client station 25, such as in an embodiment in which the first column of the steering matrix V' is utilized to beamform pilot tones for each of the spatial streams.

Alternatively, in some embodiments, full compressed feedback is transmitted for all channel configurations for both single user and multi user system configurations. For example, angle orderings listed in table 900 of FIG. 9 are utilized for both single user and multi user system configurations, in some such embodiments. However, the beamformer ignores ψ angle values fed back from the beamformee, for at least some system configurations, such as single stream single user system configurations. For example, the beamformer utilizes pre-determined equal gain values (e.g., ψ_{EG} values discussed above) for ψ angle values when reconstructing the steering matrix V' rather than using the ψ angle values received from the beamformee, in some embodiments. In such embodiments, the beamformer need not perform PA balancing, as discussed above, when ψ_{EG} values are utilized to reconstruct the steering matrix V' at the beamformer.

Figure 11:
FIG. 11 is a diagram illustrating a control field of a data unit used to transmit full or partial compressed feedback from a beamformee to a beamformer, according to an embodiment.

FIG. 11 is a diagram illustrating a MIMO control field 1100 of a data unit used to transmit compressed feedback (full or partial) from a beamformee to a beamformer, according to an embodiment. The control field 1100 is used to transmit various information describing the compressed feedback included in the data unit, in an embodiment. In one embodiment, the control field 1100 is included in a data unit that a client station 25 transmits to the AP 14 to feed back channel state information for a single stream channel to the AP 14 when WLAN 10 operates in a single user mode, i.e., when the AP 14 transmits to only one of the client stations 25-i at a time. In another embodiment, the control field 1100 is included in a data unit that a client station 25 transmits to the AP 14 to feed back channel state information for a multi-stream channel or for a single stream channel when the AP 14 when WLAN 10 operates in a multiuser mode, i.e., when the AP 14 transmits (and beamforms) to more than one of the client stations 25-*i* simultaneously. The control field 1100 includes elements, or subfields, common to both system configurations, where certain elements are interpreted differently based on the particular system configuration being utilized, in some embodiments The control field 1100 includes an MU subfield 1102 to indicate whether a single user or a multiuser mode is being utilized ("a mode indicator"). In an example embodiment, the MU subfield 1102 is set to a logic "0" to indicate single user feedback (SU FB), and is set to a logic "1" to indicate multiuser feedback "MU FB." Alternatively, in another embodiment, a logic "0" indicates MU FB and a logic "1" indicates SU FB.

The control field 1100 also includes an Nc subfield 1104 and an Nr subfield 1106 to indicate a number of columns and a number of rows, respectively, in a steering matrix corresponding to the feedback communication channel (i.e., the communication channel between the beamformer and the beamformee). More specifically, in an embodiment, a steering matrix has dimensions corresponding to (number of transmit antennas)×(number of spatial (or space-time) streams) forming a steering matrix suitable for use with the communication channel to which the channel feedback corresponds. Accordingly, in this embodiment, the Nc subfield 1104 indicates the number of spatial streams (or space-time streams if space-time encoding is utilized) corresponding to the communication channel, and the Nr subfield 1106 indicates the number of transmit antennas used at the beamformer for steering transmissions to the beamformee. In an embodiment, the particular number of spatial/space-time streams to which the steering matrix corresponds is determined at the beamformee. As an example, in an embodiment, a maximum of four transmit antennas and a maximum of four receive antennas are utilized, forming a maximum of four spatial/space-time streams. In this embodiment, depending on the particular channel configuration to which the feedback corresponds, the Nc subfield 1104 and the Nr subfield 1106 each contains a value in the range of 0 to 3 to indicate a corresponding number of spatial/space-time streams and a corresponding number of transmit antennas, respectively. In other embodiments, other suitable channel configurations are supported, and, accordingly, the Nc subfield 1104 and/or the Nr subfield 1106 contain other suitable values in at least some situations.

The control field 1100 also includes BW subfield 1108 to indicate the channel bandwidth to which the feedback data corresponds. In one embodiment, the bandwidth subfield 1108 includes two bits that are set to the value of 0 to indicate a 2 MHz BW, the value of 1 to indicate a 4 MHz BW, the value of 2 indicate an 8 MHz, and the value of 3 to indicate a 16 MHz BW. In other embodiments, the BW subfield 1108 includes other suitable number of bits and/or is used to indicate other suitable bandwidths. The control field 1100 also includes Ng subfield 1110 to indicate a tone grouping used to transmit the channel feedback.

The control field 1100 also includes a codebook info subfield 1112 used to indicate the number of bits used to quantize and/or encode the angles corresponding to the compressed feedback. In an embodiment, a codebook is composed of entries of from (x, y), where the x value corresponds to the number of bits used to quantize the $\phi$ angle value, and the y value corresponds to the number of bits used to quantize the $\psi$ angle value. In an embodiment, the specific codebook information depends on whether the single stream SU configuration or multi stream (SU or MU) configuration is being utilized. Accordingly, in this embodiment, the value of the subfield 1112 is interpreted differently depending on the particular system configuration being utilized.

In an embodiment, the subfield 1112 includes one bit allowing indication of one of two suitable codebook entries, and the one bit indication is interpreted differently based on the system configuration being utilized. For example, in an embodiment, for multi stream (SU or MU) channel configurations (indicated by Nc subfield 1104 set to indicate a number of columns greater than 1), or for multi-user (single stream or multi stream) system configurations (indicated by SU/MU subfield 1102 set to "MU"), a value of logic "0" in the codebook info field indicates (4, 2) quantizing bits for SU mode (e.g., indicated by a value of 0 in SU/MU subfield 1102), and (7, 5) quantizing bits in MU mode (e.g., indicated by a value of 1 in SU/MU subfield 1102). Similarly, in an embodiment, for multi stream (SU or MU) channel configurations (indicated by Nc subfield 1104 set to indicate a number of columns greater than 1), or for multi-user (single stream or multi stream) system configurations (indicated by SU/MU subfield 1102 set to "MU"), a logic "1" in subfield 1112 indicates (6, 4) quantizing bits in SU mode and (9, 7) quantizing bits in MU mode.

On the other hand, for single stream, single user system configurations (e.g., indicated by SU/MU subfield 1102 set to "SU" and Nc subfield 1104 set to indicate Nc=1), partial compressed feedback that includes $\phi$ angle values and omits $\psi$ angle values is utilized, and the codebook info subfield 1112 needs to indicate quantization used for the $\phi$ angle feedback and need not indicate quantization for $\psi$ angle values, which are not included in the feedback, in some embodiments. Further, in some embodiments in which $\psi$ angle values are fed back to the beamformer but are ignored by the beamformer, codebook info subfield 1112 is interpreted as if the $\psi$ angle values were omitted from the feedback transmitted by the beamformee. In some embodiments, due to a higher tolerance on inaccuracy of $\phi$ angle values for single stream channel configurations, the number of bits used to quantize the $\phi$ angle values is reduced compared to the number of bits used in multi-stream system configurations. For example, in one such embodiment, a logic "0" in the codebook info subfield 1112 indicates that 2 bits are utilized for quantization of the $\phi$ angle feedback, and a logic "1" indicates that 3 bits are utilized for quantization of the $\phi$ angle feedback. In other embodiments, logic "0" and/or logic "1" in the codebook info subfield 1112 indicate that other suitable numbers of bits (e.g., 1 bit, 4 bits, 5 bits, etc.) are utilized for quantization of the $\phi$ angle feedback.

In yet another embodiment, a logic "0" in the codebook info subfield 1112 indicates that partial compressed feedback is utilized, while a logic "1" in the codebook info subfield 1112 indicates that full compressed feedback is utilized, or vice versa. For example, a logic "0" in the codebook info subfield 1112 indicates that 2 bits are utilized for quantization of the $\phi$ angle feedback, and also indicates omission of the $\psi$ angle values in the feedback (i.e., indicates that partial compressed feedback is being utilized), in one such embodiment. On the other hand, a logic "1" in the codebook info subfield 1112 indicates (x, y) (e.g., (4,2)) quantizing bits for full compressed feedback, i.e. x bits utilized to quantize the $\phi$ angle values and y bits utilized to quantize the $\psi$ angle values in the feedback, in this embodiment.

Figure 12:
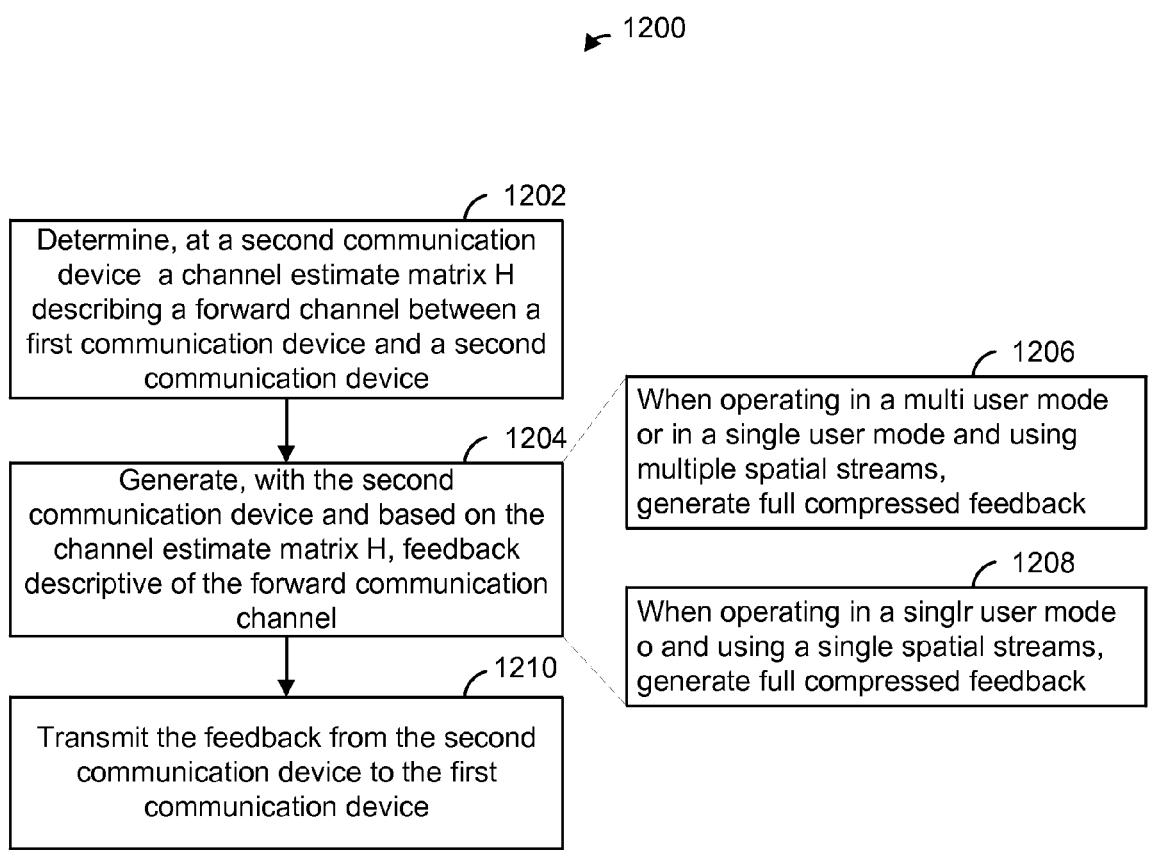
FIG. 12 is a flow diagram of an example method of providing, to a second communication device, channel state information determined at a first communication device, according to an embodiment.

FIG. 12 is a flow diagram of an example method 1200 of providing, to a second communication device, channel state information determined at a first communication device, according to an embodiment. With reference to FIG. 1, the method 1200 is implemented by the network interface 27 of the client station 25-1, in an embodiment. For example, in one such embodiment, the PHY processing unit 29 is configured to implement the method 1200. According to another embodiment, the MAC processing 28 is also configured to implement at least a part of the method 1200. With continued reference to FIG. 1, in yet another embodiment, the method 1200 is implemented by the network interface 16 (e.g., the PHY processing unit 20 and/or the MAC processing unit 18). In other embodiments, the method 1200 is implemented by other suitable network interfaces.

At block 1202, a channel estimate matrix H describing a forward communication channel between the first communication device and the second communication device is determined at the second communication device. The channel estimate matrix H is determined at block 1202 based, for example, on a sounding packet transmitted by the first communication device to the second communication device, in an embodiment. The channel estimate matrix H determined at block 1202 has dimensions of $N_{tx} \times N_{rx}$, where $N_{tx}$ corresponds to a number of transmit antennas used at the first communication device for communicating with the second communication device, and $N_{rx}$ corresponds to a number of receive antennas used at the second communication device for communicating with the first communication device, in an embodiment. Accordingly, when the communication channel between the first communication device and the second communication device includes a single spatial stream (e.g., when $N_{rx}=1$), the channel estimate matrix determined at block 1202 is a vector.

At block 1204, feedback descriptive of the forward communication channel is generated at the second communication device. Block 1204 includes blocks 1206 and 1208. At block 1206, full compressed feedback is generated. Block 1206 is performed when the communication system is operating in a multi-user mode or when the communication system is operating in a single user mode and the forward communication channel includes multiple spatial streams (e.g., $N_{tx}>1$ and $N_{rx}>1$). Full compressed feedback includes $\phi$ angle values and $\psi$ angle values corresponding to each of one or more columns of the channel estimate matrix H determined at block 1202. In an embodiment, full compressed feedback is generated as described above in connection with FIGS. 2A-2B, in an embodiment. In another embodiment, full compressed feedback is generated as described above in connection with one of FIGS. 3-4. In other embodiments, full compressed feedback is determined at block 1206 using other suitable techniques.

At block 1208, partial compressed feedback is generated. Block 1208 is performed when the communication system is operating in a single-user mode and when the forward communication channel includes a single spatial streams (e.g., $N_{rx}=1$ and $N_{tx}>1$). Partial compressed feedback generated at block 1208 includes $\phi$ angle values and omits $\psi$ angle values corresponding to the channel estimate matrix H determined at block 1202. In an embodiment, partial compressed feedback is generated as described above in connection with FIGS. 8A-8B, in an embodiment. In another embodiment, partial compressed feedback is generated as described above in connection with one of Equations 11 and 12. In other embodiments, partial compressed feedback is determined at block 1208 using other suitable techniques.

At block 1210, the feedback generated at block 1210 is transmitted from the second communication device to the first communication device. In an embodiment, feedback is first quantized (e.g., as described above in connection with Equation 4, or using another quantization scheme), and the quantized feedback is transmitted to the first communication device at block 1210. In an embodiment, a data unit that includes the feedback is generated at block 1210, and the data unit is transmitted to the first communication device. In an embodiment, the data unit generated at block 1210 includes a control field, such as the control field 1100 of FIG. 11. The control field is used to indicate, among other things, codebook information indicating a set of one or more quantization bit values used for quantizing feedback included in the data unit, in an embodiment. In other embodiments, suitable data units other than a data unit that includes the control field 1100 of FIG. 11 are generated and transmitted to the first communication device at block 1210

Figure 13:
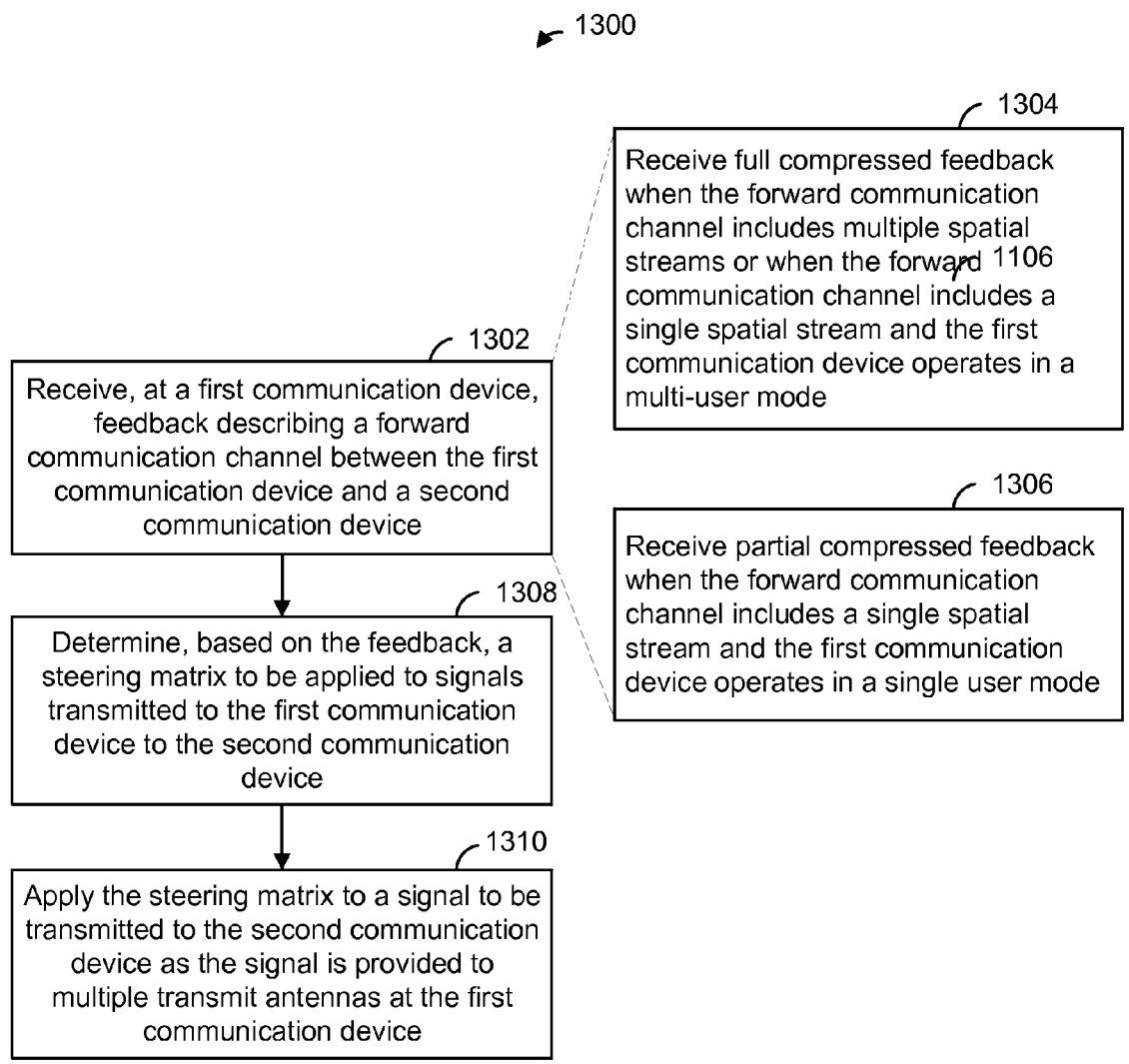
FIG. 13 is a flow diagram of an example method of beamforming in a communication system that includes a first communication device and a second communication device, according to an embodiment

FIG. 13 is a flow diagram of an example method 1300 of beamforming in a communication system that includes a first communication device and a second communication device, according to an embodiment. With reference to FIG. 1, the method 1300 is implemented by the network interface 16 of the AP 14, in an embodiment. For example, in one such embodiment, the PHY processing unit 20 is configured to implement the method 1300. According to another embodiment, the MAC processing 18 is also configured to implement at least a part of the method 1300. With continued reference to FIG. 1, in yet another embodiment, the method 1300 is implemented by the network interface 27 (e.g., the PHY processing unit 29 and/or the MAC processing unit 28). In other embodiments, the method 1300 is implemented by other suitable network interfaces.

At block 1302, feedback describing a forward communication channel between a first communication device and a second communication device is received at the first communication device from the second communication device. Block 1302 includes block 1304 and block 1306. At block 1304, full compressed feedback is received. Block 1206 is performed when the communication system is operating in a multi-user mode or when the communication system is operating in a single user mode and the forward communication channel includes multiple spatial streams. Full compressed feedback includes $\phi$ angle values and $\psi$ angle values corresponding to each of one or more columns of a channel estimate matrix H determined for the forward communication channel at the second communication device.

At block 1208, partial compressed feedback is received. Block 1208 is performed when the communication system is operating in a single-user mode and when the forward communication channel includes a single spatial streams. Partial compressed feedback generated at block 108 includes $\phi$ angle values and omits $\psi$ angle values corresponding to a channel estimate matrix H determined for the forward communication channel at the second communication device.

At block 1308, a steering matrix to be applied to signals to be transmitted to the second communication device is determined based on feedback received at block 1302. In an embodiment and/or scenario, when full compressed feedback is received at block 1302, the steering matrix at block 1308 is determined as described above in connection with FIG. 5. In another embodiment and/or scenario, when full compressed feedback is received at block 1302, the steering matrix is at block 1308 determined as described above in connection with one of FIGS. 6 and 7. In an embodiment and/or scenario, when partial compressed feedback is received at block 1302, the steering matrix at block 1308 is determined using predetermined equal gain values for $\psi$ angle values as discusses above in connection with Equation 9. In an embodiment and/or scenario, when partial compressed feedback is received at block 1302, a phase-only steering matrix is determined based on feedback received at block 1302, for example as described above in connection with Equation 14. In other embodiments and/or scenarios, the steering matrix is determined at block 1308 using other suitable techniques.

At block 1310, the steering matrix determined at block 1308 is applied to a signal to be transmitted to the second communication device as the signal is provided to multiple transmit antennas at the first communication device. In some embodiments, after the steering matrix is applied to the signal at block 1310, the signal is provided to a plurality of power amplifiers corresponding to the multiple transmit antennas to which the signal is provided at block 1310. In one such embodiment, balancing of power amplifiers to maximize output power of each power amplifier is enabled when full compressed feedback is received at block 1302 and is disabled when partial compressed feedback is received at block 1302. In other embodiments, power amplifier balancing is not disabled when partial compressed feedback is received at block 1302.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

Further aspects of the present inventions relate to one or more of the following clauses.

In an embodiment, a method of providing, from a first communication device to a second communication device, channel state information determined at the first communication device, includes determining, with the first communication device, a channel estimate matrix H describing a forward communication channel between the first communication device and the second communication device. The method also includes generating, with the first communication device and based on the channel estimate matrix H, feedback descriptive of the forward communication channel. When operating in a multi user mode or in a single user mode and with multiple spatial streams, generating the feedback comprises generating full compressed feedback, wherein full compressed feedback includes $\phi$ angle values and $\psi$ angle values corresponding to each of one or more columns of the channel estimate matrix. When operating in the single user mode and with a single spatial stream, generating the feedback comprises generating partial compressed feedback, wherein partial compressed feedback includes $\phi$ angle values, and omits $\psi$ angle values, corresponding to the channel estimate matrix. The method further comprises transmitting the feedback from the first communication device to the second communication device.

In other embodiments, the method includes one or more of the following features.

Generating partial compressed feedback includes determining a steering matrix V based on the channel matrix H, generating a steering matrix V' by rotating each element of the steering matrix V such that the last element of the steering matrix V becomes a positive real number, and performing partial QR decomposition of the steering matrix V' to determine the $\phi$ angle values to be included in the partial compressed feedback.

Generating the partial compressed feedback includes determining, directly from the channel matrix H, $\phi$ angle values to be included in the partial compressed feedback.

Generating the feedback further comprises quantizing the feedback.

A first set of quantization bits is used for quantizing the feedback when the feedback corresponds to the full compressed feedback.

A second set of quantization bits is used for quantizing the feedback when the feedback corresponds to the partial compressed feedback.

The second set of quantization bits is different than the first set of quantization bits.

Transmitting the feedback comprises generating a data unit to include the feedback.

The data unit further includes a codebook information field indicating a set of quantization bits used for quantizing the feedback.

The codebook information field is interpreted differently based on whether the feedback corresponds to the full compressed feedback or to the partial compressed feedback.

In another embodiment, an apparatus comprises a network interface configured to determine a channel estimate matrix H describing a forward communication channel between a first communication device and a second communication device. The network interface is also configured to generate feedback descriptive of the forward communication channel. When operating in a multi user mode or in a single user mode and with multiple spatial streams, the network interface is configured to generate full compressed feedback, wherein full compressed feedback includes $\phi$ angle values and $\psi$ angle values corresponding to each of one or more columns of the channel estimate matrix. When operating in the single user mode and with a single spatial stream, the network interface is configured to generate partial compressed feedback, wherein partial compressed feedback includes $\phi$ angle values, and omits $\psi$ angle values, corresponding to the channel estimate matrix. The network interface is further configured to transmit the feedback to the second communication device.

In other embodiments, the apparatus includes one or more of the following features.

The network interface is configured to generate partial compressed feedback at least by determining a steering matrix V based on the channel matrix H, generating a steering matrix V' by rotating each element of the steering matrix V such that the last element of the steering matrix V becomes a positive real number, and performing partial QR decomposition of the steering matrix V' to determine the $\phi$ angle values to be included in the feedback.

The network interface is configured to generate partial compressed feedback at least by determining, directly from the channel matrix H, $\phi$ angle values to be included in the feedback.

The network interface is further configured to quantize the feedback prior to transmitting the feedback.

The network interface is configured to use a first set of quantization bits for quantizing the feedback when the feedback corresponds to the full compressed feedback.

The network interface is configured to use a second set quantization of bits for quantizing the feedback when the feedback corresponds to the partial compressed feedback.

The second set of quantization bits is different than the first set of quantization bits.

The network interface is further configured to generate a data unit to include the feedback.

The data unit further includes a codebook information field indicating a set of quantization bits used for quantizing the feedback.

The codebook information field is interpreted differently based on whether the feedback corresponds to the full compressed feedback or to the partial compressed feedback.

In yet another embodiment, a method of beamforming in a communication system that includes a first communication device and a second communication device includes receiving, at the first communication device from the second communication device, feedback describing a forward communication channel between the first communication device and the second communication device. Feedback corresponds to one of (i) full compressed feedback when the forward communication channel includes multiple spatial streams or when the forward communication channel includes a single spatial stream and the first communication device operates in a multi-user mode, wherein full compressed feedback includes $\phi$ angle values and $\psi$ angle values corresponding to each of one or more columns of a channel estimate matrix determined for the forward communication channel at the second communication device, or (ii) partial compressed feedback when the forward communication channel includes a single spatial stream and the first communication device operates in a single user mode, wherein partial compressed feedback includes $\phi$ angle values and omits $\psi$ angle values corresponding to the channel estimate matrix determined for the forward communication channel at the second communication device. The method also includes determining, based on the feedback, a steering matrix to be applied to signals to be transmitted from the first communication device to the second communication device. The method additionally includes applying the steering matrix to a signal to be transmitted to the second communication device as the signal is provided to multiple transmit antennas at the first communication device.

In other embodiments, the method includes one or more of the following features.

When feedback corresponds to partial compressed feedback, determining the steering matrix comprises determining the steering matrix by reconstructing, based on the received $\phi$ angle values and pre-determined $\psi$ angle values, a receiver steering matrix determined for the forward communication channel at the receiving device.

When feedback corresponds to partial compressed feedback, determining the steering matrix comprises determining the steering matrix by reconstructing, based on the received $\phi$ angle values, a phase only version of a receiver steering matrix determined for the forward communication channel at the second communication device.

The method further comprises after applying the steering matrix to the signal, providing the signal to a plurality of power amplifiers corresponding to the multiple transmit antennas, and balancing output powers of the plurality of power amplifiers to maximize output power of each power amplifier of the plurality of power amplifiers.

When feedback corresponds to full compressed feedback, balancing of output power amplifiers is enabled.

When feedback corresponds to partial compressed feedback, balancing of output power amplifiers is disabled.

Determining the steering matrix includes de-quantizing at least the received $\phi$ angle values.

De-quantizing is performed (i) based on a first number of quantization bits when received feedback is full compressed feedback and (ii) based on a second number of quantization bits when received feedback is partial compressed feedback, wherein the second number of quantization bits is different than the first number of quantization bits.

The method further comprising receiving codebook information indicating a number of quantization bits used for generating the feedback at the receiving device.

The codebook information is interpreted differently depending on whether the received feedback is full compressed feedback or partial compressed feedback.

In still another embodiment, an apparatus comprises a network interface configured to receive, from a first communication device, feedback describing a forward communication channel between the first communication device and a second communication device. Feedback corresponds to one of (i) full compressed feedback when the forward communication channel includes multiple spatial streams or when the forward communication channel includes a single spatial stream and the first communication device operates in a multi-user mode, wherein full compressed feedback includes $\phi$ angle values and $\psi$ angle values corresponding to each of one or more columns of a channel estimate matrix determined for the forward communication channel at the second communication device, or (ii) partial compressed feedback when the forward communication channel includes a single spatial stream and the first communication device operates in a single user mode, wherein partial compressed feedback includes $\phi$ angle values and omits $\psi$ angle values corresponding to the channel estimate matrix determined for the forward communication channel at the second communication device. The network interface is also configured to determine, based on the feedback, a steering matrix to be applied to signals to be transmitted to the second device. The network interface is additionally configured to apply the steering matrix to a signal to be transmitted to the second device as the signal is provided to multiple transmit antennas at the first communication device.

In other embodiments, the apparatus includes one or more of the following features.

The network interface is configured to, when feedback corresponds to partial compressed feedback, determine the steering matrix at least by reconstructing, based on the received $\phi$ angle values and pre-determined $\psi$ angle values, a receiver steering matrix determined for the forward communication channel at the second communication device.

The network interface is configured to, when feedback corresponds to partial compressed feedback, determine the steering matrix at least by reconstructing, based on the received φ angle values, a phase-only version of a receiver steering matrix determined for the forward communication channel at the second communication device.

The network interface is further configured to after applying the steering matrix to the signal, provide the signal to a plurality of power amplifiers corresponding to the multiple transmit antennas, and balance output powers of the plurality of power amplifiers to maximize output power of each power amplifier of the plurality of power amplifiers.

When feedback corresponds to full compressed feedback, enable balancing of output power amplifiers.

When feedback corresponds to partial compressed feedback, disable balancing of output power amplifiers.

The network interface is further configured to de-quantize at least the received φ angle values prior to determining the steering matrix.

De-quantizing is performed (i) based on a first number of quantization bits when received feedback is full compressed feedback and (ii) based on a second number of quantization bits when received feedback is partial compressed feedback.

The second number of quantization bits is different than the first number of quantization bits.

The network interface is further configured to receive codebook information indicating a number of quantization bits used for generating the feedback at the second communication device, and interpret the codebook information differently depending on whether the received feedback is full compressed feedback or partial compressed feedback.

What is claimed:

1. A method of providing, from a first communication device to a second communication device, channel state information determined at the first communication device, the method comprising:
   determining, with the first communication device, a channel estimate matrix H describing a forward communication channel between the first communication device and the second communication device;
   generating, with the first communication device and based on the channel estimate matrix H, feedback descriptive of the forward communication channel, wherein
      when operating in a multi user mode or in a single user mode and with multiple spatial streams, generating the feedback comprises generating full compressed feedback, wherein full compressed feedback includes φ angle values and ψ angle values corresponding to each of one or more columns of the channel estimate matrix, and
      when operating in the single user mode and with a single spatial stream, generating the feedback comprises generating partial compressed feedback, wherein partial compressed feedback includes φ angle values, and omits ψ angle values, corresponding to the channel estimate matrix, wherein the φ angle values and the ψ angle values correspond to rotation angles of QR decomposition process; and
   wherein the method further comprises transmitting the feedback from the first communication device to the second communication device.

2. The method of claim 1, wherein generating partial compressed feedback includes:
   determining a steering matrix V based on the channel matrix H;
   generating a steering matrix V' by rotating each element of the steering matrix V such that the last element of the steering matrix V becomes a positive real number; and
   performing partial QR decomposition of the steering matrix V' to determine the φ angle values to be included in the partial compressed feedback.

3. The method of claim 1, wherein generating the partial compressed feedback includes determining, directly from the channel matrix H, φ angle values to be included in the partial compressed feedback.

4. The method of claim 1, wherein generating the feedback further comprises quantizing the feedback, wherein a first set of quantization bits is used for quantizing the feedback when the feedback corresponds to the full compressed feedback, and wherein a second set of quantization bits is used for quantizing the feedback when the feedback corresponds to the partial compressed feedback, wherein the second set of quantization bits is different than the first set of quantization bits.

5. The method of claim 4, wherein transmitting the feedback comprises generating a data unit to include the feedback, wherein the data unit further includes a codebook information field indicating the set of quantization bits used for quantizing the feedback, and wherein the codebook information field is interpreted differently based on whether the feedback corresponds to the full compressed feedback or to the partial compressed feedback.

6. An apparatus, comprising:
   a network interface configured to
      determine a channel estimate matrix H describing a forward communication channel between a first communication device and a second communication device, and
      generate feedback descriptive of the forward communication channel, wherein
         when operating in a multi user mode or in a single user mode and with multiple spatial streams, generating the feedback comprises generating full compressed feedback, wherein full compressed feedback includes φ angle values and ψ angle values corresponding to each of one or more columns of the channel estimate matrix, and
         when operating in the single user mode and with a single spatial stream, generating the feedback comprises generating partial compressed feedback, wherein partial compressed feedback includes φ angle values, and omits ψ angle values, corresponding to the channel estimate matrix, wherein the φ angle values and the ψ angle values correspond to rotation angles of QR decomposition process,
   wherein the network interface is further configured to transmit the feedback to the second communication device.

7. The apparatus of claim 6, wherein the network interface is configured to generate partial compressed feedback at least by:
   determining a steering matrix V based on the channel matrix H;
   generating a steering matrix V' by rotating each element of the steering matrix V such that the last element of the steering matrix V becomes a positive real number; and
   performing partial QR decomposition of the steering matrix V' to determine the φ angle values to be included in the feedback.

8. The apparatus of claim 6, wherein the network interface is configured to generate partial compressed feedback at least by determining, directly from the channel matrix H, φ angle values to be included in the feedback.

9. The apparatus of claim 6, wherein the network interface is further configured to quantize the feedback prior to transmitting the feedback, wherein the network interface is configured to use a first set of quantization bits for quantizing the feedback when the feedback corresponds to the full compressed feedback, and wherein the network interface is configured to use a second set quantization of bits for quantizing the feedback when the feedback corresponds to the partial compressed feedback, wherein the second set of quantization bits is different than the first set of quantization bits.

10. The apparatus of claim 9, wherein the network interface is further configured to generate a data unit to include the feedback, wherein the data unit further includes a codebook information field indicating the set of quantization bits used for quantizing the feedback, and wherein the codebook information field is interpreted differently based on whether the feedback corresponds to the full compressed feedback or to the partial compressed feedback.

11. A method of beamforming in a communication system that includes a first communication device and a second communication device, the method comprising:
receiving, at the first communication device from the second communication device, feedback describing a forward communication channel between the first communication device and the second communication device, wherein the feedback corresponds to
(i) full compressed feedback when the forward communication channel includes multiple spatial streams or when the forward communication channel includes a single spatial stream and the first communication device operates in a multi-user mode, wherein full compressed feedback includes φ angle values and ψ angle values corresponding to each of one or more columns of a channel estimate matrix determined for the forward communication channel at the second communication device,
(ii) partial compressed feedback when the forward communication channel includes a single spatial stream and the first communication device operates in a single user mode, wherein partial compressed feedback includes φ angle values and omits ψ angle values corresponding to the channel estimate matrix determined for the forward communication channel at the second communication device, wherein the φ angle values and the ψ angle values correspond to rotation angles of QR decomposition process,
determining, based on the feedback, a steering matrix to be applied to signals to be transmitted from the first communication device to the second communication device; and
applying the steering matrix to a signal to be transmitted to the second communication device as the signal is provided to multiple transmit antennas at the first communication device.

12. The method of claim 11, wherein, when the feedback corresponds to partial compressed feedback, determining the steering matrix comprises determining the steering matrix by reconstructing, based on the received φ angle values and pre-determined ψ angle values, a receiver steering matrix determined for the forward communication channel at the second communication device.

13. The method of claim 11, wherein, when the feedback corresponds to partial compressed feedback, determining the steering matrix comprises determining the steering matrix by reconstructing, based on the received φ angle values, a phase only version of a receiver steering matrix determined for the forward communication channel at the second communication device.

14. The method of claim 11, wherein the method further comprises:
after applying the steering matrix to the signal, providing the signal to a plurality of power amplifiers corresponding to the multiple transmit antennas, and balancing output powers of the plurality of power amplifiers to maximize output power of each power amplifier of the plurality of power amplifiers, wherein
when the feedback corresponds to full compressed feedback, balancing of output power amplifiers is enabled, and
when the feedback corresponds to partial compressed feedback, balancing of output power amplifiers is disabled.

15. The method of claim 11, wherein determining the steering matrix includes de-quantizing at least the received φ angle values, wherein the de-quantizing is performed (i) based on a first number of quantization bits when received feedback is full compressed feedback and (ii) based on a second number of quantization bits when received feedback is partial compressed feedback, wherein the second number of quantization bits is different than the first number of quantization bits.

16. The method of claim 11, the method further comprising receiving codebook information indicating a number of quantization bits used for generating the feedback at the receiving device, wherein the codebook information is interpreted differently depending on whether the received feedback is full compressed feedback or partial compressed feedback.

17. An apparatus, comprising:
A network Interface configured to
receive, from a first communication device, feedback describing a forward communication channel between the first communication device and a second communication device, wherein the feedback corresponds to
(i) full compressed feedback when the forward communication channel includes multiple spatial streams or when the forward communication channel includes a single spatial stream and the first communication device operates in a multi-user mode, wherein full compressed feedback includes φ angle values and ψ angle values corresponding to each of one or more columns of a channel estimate matrix determined for the forward communication channel at the second communication device,
(ii) partial compressed feedback when the forward communication channel includes a single spatial stream and the first communication device operates in a single user mode, wherein partial compressed feedback includes φ angle values and omits ψ angle values corresponding to the channel estimate matrix determined for the forward communication channel at the second communication device, wherein the φ angle values and the ψ angle values correspond to rotation angles of QR decomposition process,
determine, based on the feedback, a steering matrix to be applied to signals to be transmitted from the second communication device, and
apply the steering matrix to a signal to be transmitted to the second communication device as the signal is provided to multiple transmit antennas at the first communication device.

18. The apparatus of claim 17, wherein the network interface is configured to, when the feedback corresponds to partial compressed feedback, determine the steering matrix at least by reconstructing, based on the received $\phi$ angle values and pre-determined $\psi$ angle values, a receiver steering matrix determined for the forward communication channel at the second communication device.

19. The apparatus of claim 17, wherein the network interface is configured to, when the feedback corresponds to partial compressed feedback, determine the steering matrix at least by reconstructing, based on the received $\phi$ angle values, a phase-only version of a receiver steering matrix determined for the forward communication channel at the second communication device.

20. The apparatus of claim 17, wherein the network interface is further configured to:
    after applying the steering matrix to the signal, provide the signal to a plurality of power amplifiers corresponding to the multiple transmit antennas, and balance output powers of the plurality of power amplifiers to maximize output power of each power amplifier of the plurality of power amplifiers; and
    when the feedback corresponds to full compressed feedback, enable balancing of output power amplifiers; and
    when the feedback corresponds to partial compressed feedback, disable balancing of output power amplifiers.

21. The apparatus of claim 17, wherein the network interface is further configured to de-quantize at least the received $\phi$ angle values prior to determining the steering matrix, wherein the de-quantizing is performed (i) based on a first number of quantization bits when received feedback is full compressed feedback and (ii) based on a second number of quantization bits when the received feedback is partial compressed feedback, wherein the second number of quantization bits is different than the first number of quantization bits.

22. The apparatus of claim 17, wherein the network interface is further configured to:
    receive codebook information indicating a number of quantization bits used for generating the feedback at the second communication device; and
    interpret the codebook information differently depending on whether the received feedback is full compressed feedback or partial compressed feedback.

* * * * *